United States Patent
Yoon et al.

(10) Patent No.: US 9,458,063 B2
(45) Date of Patent: Oct. 4, 2016

(54) DIELECTRIC CERAMIC COMPOSITION AND MULTILAYER CERAMIC CAPACITOR INCLUDING THE SAME

(71) Applicant: SAMSUNG ELECTRO-MECHANICS CO., LTD., Suwon-Si, Gyeonggi-Do (KR)

(72) Inventors: Seok Hyun Yoon, Suwon-Si (KR); Jae Sung Park, Suwon-Si (KR); Chang Hoon Kim, Suwon-Si (KR); Doo Young Kim, Suwon-Si (KR)

(73) Assignee: SAMSUNG ELECTRO-MECHANICS CO., LTD., Suwon-Si, Gyeonggi-Do (KR)

( * ) Notice: Subject to any disclaimer, the term of this patent is extended or adjusted under 35 U.S.C. 154(b) by 0 days.

(21) Appl. No.: 14/507,411

(22) Filed: Oct. 6, 2014

(65) Prior Publication Data

US 2016/0002111 A1    Jan. 7, 2016

(30) Foreign Application Priority Data

Jul. 7, 2014    (KR) .................. 10-2014-0084473

(51) Int. Cl.
C04B 35/468    (2006.01)
H01G 4/30    (2006.01)
H01G 4/12    (2006.01)
H01G 4/232    (2006.01)

(52) U.S. Cl.
CPC ........... *C04B 35/468* (2013.01); *H01G 4/1227* (2013.01); *H01G 4/232* (2013.01); *H01G 4/30* (2013.01)

(58) Field of Classification Search
CPC ... C04B 35/46; C04B 35/462; C04B 35/465; C04B 35/468; C04B 35/4682; H01B 3/12; H01G 4/018; H01G 4/12; H01G 4/1218; H01G 4/1227

USPC .................................................. 501/134–139
See application file for complete search history.

(56) References Cited

U.S. PATENT DOCUMENTS

| | | | |
|---|---|---|---|
| 8,107,220 B2* | 1/2012 | Nakamura | H01G 4/30 361/306.1 |
| 8,358,495 B2* | 1/2013 | Shiota | H01G 4/1209 361/321.2 |
| 2011/0085280 A1* | 4/2011 | Muto | C04B 35/4682 361/321.4 |
| 2012/0147524 A1* | 6/2012 | Okamoto | H01B 3/12 361/321.4 |

(Continued)

FOREIGN PATENT DOCUMENTS

| | | |
|---|---|---|
| JP | 2000-223352 A | 8/2000 |
| JP | 2003-165768 A | 6/2003 |
| KR | 1999-0075846 A | 10/1999 |

*Primary Examiner* — Noah Wiese
(74) *Attorney, Agent, or Firm* — McDermott Will & Emery LLP

(57) ABSTRACT

A dielectric ceramic composition may include a base material main ingredient and an accessory ingredient. The accessory ingredient contains one or more selected from a group consisting of oxides and carbonates of one or more elements among Bi, Li, and Cu. When the accessory ingredient contains Bi, a content of Bi may be 0.1 to 1.0 part by mole, based on 100 parts by mole of the base material main ingredient, when the accessory ingredient contains Li, a content of Li may be 0.1 to 1.0 part by mole, based on 100 parts by mole of the base material main ingredient, and when the accessory ingredient contains Cu, a content of Cu may be 0.1 to 1.0 part by mole, based on 100 parts by mole of the base material main ingredient.

22 Claims, 3 Drawing Sheets

(56) References Cited

U.S. PATENT DOCUMENTS

| | | | |
|---|---|---|---|
| 2013/0083449 A1* | 4/2013 | Yoon | C04B 35/4682 361/321.4 |
| 2013/0083450 A1* | 4/2013 | Yoon | H01G 4/30 361/321.4 |
| 2013/0201602 A1* | 8/2013 | Takeoka | B32B 18/00 361/301.4 |
| 2013/0222968 A1* | 8/2013 | Koga | C01G 23/006 361/301.4 |
| 2014/0009864 A1* | 1/2014 | Takashima | C04B 35/4682 361/301.4 |

* cited by examiner

DIELECTRIC CERAMIC COMPOSITION AND MULTILAYER CERAMIC CAPACITOR INCLUDING THE SAME

CROSS-REFERENCE TO RELATED APPLICATION

This application claims the benefit of Korean Patent Application No. 10-2014-0084473 filed on Jul. 7, 2014, with the Korean Intellectual Property Office, the disclosure of which is incorporated herein by reference.

BACKGROUND

The present disclosure relates to a dielectric ceramic composition and a multilayer ceramic capacitor including the same.

Among ceramic electronic components, a multilayer ceramic capacitor may include a plurality of stacked dielectric layers, internal electrodes disposed to face each other with each of the dielectric layers interposed therebetween, and external electrodes electrically connected to the internal electrodes.

Multilayer ceramic capacitors have been widely used as components for computers and mobile communications devices such as personal data assistants (PDA), mobile phones, and the like, due to advantages such as a small size, high capacitance, easiness of mounting, and the like.

In general, multilayer ceramic capacitors are manufactured by stacking internal electrodes and dielectric layers formed using a paste for an internal electrode and a paste for a dielectric layer through a sheet method, a printing method, or the like, and simultaneously sintering the same.

According to the related art, as a dielectric material used in a multilayer ceramic capacitor or the like, a barium titanate ($BaTiO_3$)-based dielectric material has been used.

Meanwhile, in accordance with the development of a high capacitance multilayer ceramic capacitor, the implementation of reliability and high-temperature withstand voltage characteristics have emerged as important issues.

RELATED ART DOCUMENT

Korean Patent Laid-Open Publication No. 1999-0075846

SUMMARY

Some exemplary embodiments in the present disclosure may provide a dielectric ceramic composition and a multilayer ceramic capacitor containing the same.

According to some exemplary embodiments in the present disclosure, a dielectric ceramic composition may contain a base material main ingredient and an accessory ingredient. The accessory ingredient may contain one or more selected from a group consisting of oxides and carbonates of one or more elements among Bi, Li, and Cu. When the accessory ingredient contains Bi, a content of Bi may be 0.1 to 1.0 part by mole, based on 100 parts by mole of the base material main ingredient, when the accessory ingredient contains Li, a content of Li may be 0.1 to 1.0 part by mole, based on 100 parts by mole of the base material main ingredient, and when the accessory ingredient contains Cu, a content of Cu may be 0.1 to 1.0 part by mole, based on 100 parts by mole of the base material main ingredient.

According to some embodiments in the present disclosure, a multilayer ceramic capacitor may include: a ceramic body in which dielectric layers and first and second internal electrodes are alternately stacked; and first and second external electrodes formed on outer surfaces of the ceramic body and electrically connected to the first and second internal electrodes. The dielectric layer may contain a base material main ingredient and an accessory ingredient, and the accessory ingredient may contain one or more selected from oxides and carbonates of one or more elements among Bi, Li, and Cu. When the accessory ingredient contains Bi, a content of Bi may be 0.1 to 1.0 part by mole, based on 100 parts by mole of the base material main ingredient, when the accessory ingredient contains Li, a content of Li may be 0.1 to 1.0 part by mole, based on 100 parts by mole of the base material main ingredient, and when the accessory ingredient contains Cu, a content of Cu may be 0.1 to 1.0 part by mole, based on 100 parts by mole of the base material main ingredient.

BRIEF DESCRIPTION OF DRAWINGS

The above and other aspects, features and other advantages in the present disclosure will be more clearly understood from the following detailed description taken in conjunction with the accompanying drawings, in which.

DETAILED DESCRIPTION

Figure 1:
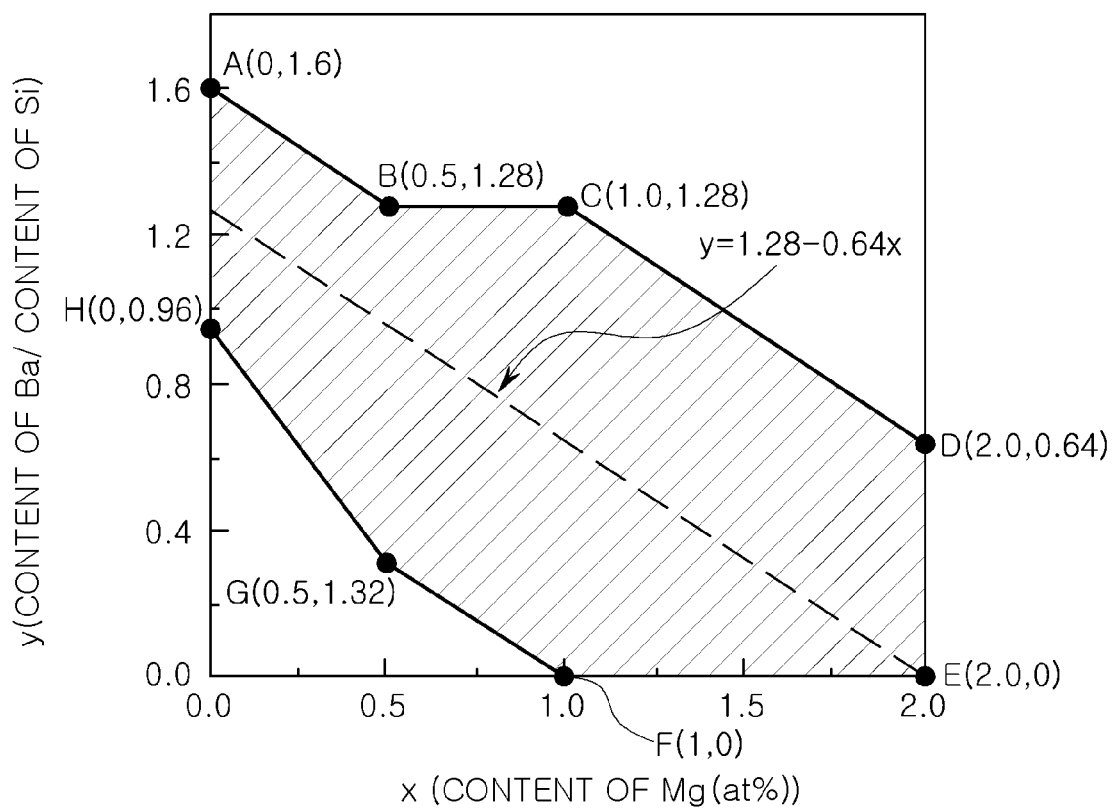
FIG. 1 illustrates ranges of x and y in which a high degree of permittivity and good high-temperature withstand voltage characteristics may be implemented when a content of Mg of a second accessory ingredient contained in a dielectric ceramic composition according to an embodiment in the present disclosure is defined as x, and a ratio (Ba/Si) of a content of Ba of a fourth accessory ingredient with respect to a content of Si of a sixth accessory ingredient contained in the dielectric ceramic composition is defined as y.

Exemplary embodiments in the present disclosure will now be described in detail with reference to the accompanying drawings.

The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

A dielectric ceramic composition according to an embodiment in the present disclosure is provided. Examples of an electronic component containing the dielectric ceramic composition include a capacitor, an inductor, a piezoelectric element, a varistor, a thermistor, and the like. Hereinafter, the dielectric ceramic composition and a multilayer ceramic capacitor as an example of the electronic component will be described.

The dielectric ceramic composition according to an embodiment in the present disclosure may contain a base material main ingredient containing Ba and Ti and an accessory ingredient, and the accessory ingredient contains one or more selected from a group consisting of oxides and carbonates of one or more elements among Bi, Li, and Cu.

A respective content of the element contained in the accessory ingredient among Bi, Li, and Cu may be 0.1 to 1 part by mole, based on 100 parts by mole of the base material main ingredient.

For example, when the accessory ingredient contains Bi, a content of Bi may be 0.1 to 1 part by mole, based on 100 parts by mole of the base material main ingredient, when the accessory ingredient contains Li, a content of Li may be 0.1 to 1 part by mole, based on 100 parts by mole of the base material main ingredient, and when the accessory ingredient contains Cu, a content of Cu may be 0.1 to 1 part by mole, based on 100 parts by mole of the base material main ingredient.

Hereinafter, one or more selected from the group consisting of oxides and carbonates of one or more elements among Bi, Li, and Cu may be designated and described as a seventh accessory ingredient.

The dielectric ceramic composition according to an embodiment in the present disclosure may be sintered at a relatively low temperature and may be implemented to have a high degree of permittivity.

For example, the dielectric ceramic composition according to an embodiment in the present disclosure may be sintered at 1130° C. or less and may implement permittivity (relative permittivity) of 4000 or more.

In addition, a multilayer ceramic capacitor having high reliability while satisfying temperature characteristics may be provided using such a dielectric ceramic composition.

The dielectric ceramic composition according to an embodiment in the present disclosure may contain the base material main ingredient and the accessory ingredient, and the accessory ingredient may include first to seventh accessory ingredients.

Hereinafter, respective ingredients of the dielectric ceramic composition according to an embodiment in the present disclosure will be described in detail.

a) Base Material Main Ingredient

The dielectric ceramic composition according to an embodiment in the present disclosure may contain a base material main ingredient containing Ba and Ti.

According to an embodiment in the present disclosure, the base material main ingredient may contain one or more selected from a group consisting of $BaTiO_3$, $(Ba_{1-x}Ca_x)(Ti_{1-y}Ca_y)O_3$ ($0 \le x \le 0.3$, $0 \le y \le 0.1$), $(Ba_{1-x}Ca_x)(Ti_{1-y}Zr_y)O_3$ ($0 \le x \le 0.3$, $0 \le y \le 0.5$), and $Ba(Ti_{1-y}Zr_y)O_3$ ($0 < y \le 0.5$), but is not limited thereto.

As described below, contents of magnesium (Mg), a second accessory ingredient, barium (Ba), a fourth accessory ingredient, and silicon (Si), a sixth accessory ingredient, are adjusted with respect to the base material main ingredient, such that a dielectric ceramic composition having a high degree of permittivity and excellent high-temperature withstand voltage characteristics may be provided.

Further, the content of the seventh accessory ingredient may be adjusted, such that the sintering may be performed at a relatively low temperature, and sintering properties may be improved.

The base material main ingredient may be contained in the form of a powder, and an average grain size is not particularly limited, but may be 1000 nm or less.

b) First Accessory Ingredient

According to an embodiment in the present disclosure, the dielectric ceramic composition may contain one or more of one or more elements selected from a group consisting of Mn, V, Cr, Fe, Ni, Co, Cu, and Zn, oxides thereof, and carbonates thereof, as the first accessory ingredient.

The first accessory ingredient may be contained in a content of 0.1 to 2.0 parts by mole, based on 100 parts by mole of the base material main ingredient, in the dielectric ceramic composition.

The content of the first accessory ingredient described above may be based on a content of one or more elements among Mn, V, Cr, Fe, Ni, Co, Cu, and Zn contained in the first accessory ingredient, regardless of the form of an addition such as that of oxide or carbonate.

For example, a sum of contents of one or more variable-valence acceptor elements among Mn, V, Cr, Fe, Ni, Co, Cu, and Zn contained in the first accessory ingredient may be 0.1 to 2.0 parts by mole, based on 100 parts by mole of the base material main ingredient.

The first accessory ingredient may serve to improve reduction resistance of the dielectric ceramic composition and high-temperature withstand voltage characteristics of a multilayer ceramic capacitor formed using the dielectric ceramic composition.

The content of the first accessory ingredient and contents of second to seventh accessory ingredients to be described below, which are relative contents based on 100 parts by mole of the base material main ingredient, may be defined as, for example, part by mole of a metal or metalloid (Si) contained in a respective accessory ingredient. Parts by mole of the metal or metalloid may include a part by mole of an ionic metal or metalloid.

In the case in which the content of the first accessory ingredient is 0.1 to 2 parts by mole, based on 100 parts by mole of the base material main ingredient, a dielectric ceramic composition having a high degree of permittivity and good high-temperature withstand voltage characteristics may be provided.

In the case in which the content of the first accessory ingredient is less than 0.1 part by mole, the sintering temperature may be increased, and the high-temperature withstand voltage characteristics may be somewhat deteriorated.

In the case in which the content of the first accessory ingredient is more than 2.0 parts by mole, the high-temperature withstand voltage characteristics and room-temperature resistivity may be deteriorated.

The dielectric ceramic composition according to an embodiment in the present disclosure may contain the first accessory ingredient having a content of 0.1 to 2.0 parts by mole, based on 100 parts by mole of base material main ingredient, and accordingly, the dielectric ceramic composition may be sintered at a relatively low temperature and may have high high-temperature withstand voltage characteristics.

c) Second Accessory Ingredient

According to an embodiment in the present disclosure, the dielectric ceramic composition may contain one or more of oxides and carbonates of fixed-valence acceptor elements including Mg, as the second accessory ingredient.

The second accessory ingredient may be contained in a content of 2.0 parts by mole or less, based on 100 parts by mole of the base material main ingredient.

The content of the second accessory ingredient may be based on a content of Mg contained in the second accessory ingredient, regardless of the form of an addition such as that of oxide or carbonate.

For example, the content of Mg contained in the second accessory ingredient may be 2.0 parts by mole or less, based on 100 parts by mole of the base material main ingredient.

The second accessory ingredients, which are the fixed-valence acceptor element and compounds containing the same, may adjust a micro structure (suppressing abnormal grain growth) in the dielectric ceramic composition and may impart reduction resistance.

In the case in which the content of the second accessory ingredient is more than 2.0 parts by mole, based on 100 parts by mole of a dielectric base material main ingredient, a problem in which permittivity may be decreased may be present.

d) Third Accessory Ingredient

According to an embodiment in the present disclosure, the dielectric ceramic composition may contain a third accessory ingredient containing one or more selected from a group consisting of oxides and carbonates of one or more elements among Y, Dy, Ho, Er, Gd, Ce, Nd, and Sm.

The third accessory ingredient may be contained in a content of 4.0 parts by mole or less, based on 100 parts by mole of the base material main ingredient.

The content of the third accessory ingredient may be based on a content of one or more elements among Y, Dy, Ho, Er, Gd, Ce, Nd, and Sm contained in the third accessory ingredient, regardless of the form of an addition such as that of oxide or carbonate.

For example, a sum of contents of one or more elements among Y, Dy, Ho, Er, Gd, Ce, Nd, and Sm contained in the third accessory ingredient may be 4.0 parts by mole or less, based on 100 parts by mole of the base material main ingredient.

According to an embodiment in the present disclosure, the third accessory ingredient may serve to prevent reliability of the multilayer ceramic capacitor to which the use of the dielectric ceramic composition is applied from being deteriorated, and in the case in which the third accessory ingredient is contained in a content of 4.0 parts by mole or less, based on 100 parts by mole of the base material main ingredient, a dielectric ceramic composition having a high degree of permittivity and good high-temperature withstand voltage characteristics may be provided.

In the case in which the content of the third accessory ingredient is more than 4.0 parts by mole, based on 100 parts by mole of the base material main ingredient, reliability may be deteriorated, or permittivity or high-temperature withstand voltage characteristics of the dielectric ceramic composition may be deteriorated.

e) Fourth Accessory Ingredient

According to an embodiment in the present disclosure, the dielectric ceramic composition may contain a fourth accessory ingredient containing one or more of oxides and carbonates of Ba.

The fourth accessory ingredient may be contained in a content of 4.0 parts by mole or less, based on 100 parts by mole of the base material main ingredient.

The content of the fourth accessory ingredient may be based on a content of Ba contained in the fourth accessory ingredient, regardless of the form of an addition such as that of oxide or carbonate.

For example, the content of Ba contained in the fourth accessory ingredient may be 4.0 parts by mole or less, based on 100 parts by mole of the base material main ingredient.

The fourth accessory ingredient may play roles such as sintering promotion, permittivity adjustment, and the like, in the dielectric ceramic composition, and in the case in which the content thereof is more than 4.0 parts by mole, based on 100 parts by mole of the dielectric base material main ingredient, permittivity may be decreased, or the sintering temperature may be increased.

f) Fifth Accessory Ingredient

According to an embodiment in the present disclosure, the dielectric ceramic composition may contain a fifth accessory ingredient containing one or more selected from a group consisting of oxides and carbonates of either of or both of Ca and Zr.

The fifth accessory ingredient may be contained in a content of 20 parts by mole or less, based on 100 parts by mole of the base material main ingredient.

The content of the fifth accessory ingredient may be based on a content of either of or both of Ca and Zr contained in the fifth accessory ingredient, regardless of the form of an addition such as that of oxide or carbonate.

For example, a sum of contents of either of or both of Ca and Zr contained in the fifth accessory ingredient may be 20 parts by mole or less, based on 100 parts by mole of the base material main ingredient.

The fifth accessory ingredient may serve to form a core-shell structure in the dielectric ceramic composition to improve permittivity and reliability, and in the case in which the fifth accessory ingredient is contained in a content of 20 parts by mole or less, based on 100 parts by mole of the base material main ingredient, a dielectric ceramic composition having a high degree of permittivity and good high-temperature withstand voltage characteristics may be provided.

In the case in which the content of the fifth accessory ingredient is more than 20 parts by mole, based on 100 parts by mole of the dielectric base material main ingredient, permittivity may be decreased.

g) Sixth Accessory Ingredient

According to an embodiment in the present disclosure, the dielectric ceramic composition may contain a sixth accessory ingredient containing one or more selected from a group consisting of glass containing Si, and oxides and carbonates of either of or both of Si and Al.

The sixth accessory ingredient may be contained in a content of 3.0 parts by mole or less, based on 100 parts by mole of the base material main ingredient.

The content of the sixth accessory ingredient may be based on a content of either of or both of Si and Al contained in the sixth accessory ingredient, regardless of the form of an addition such as that of glass, oxide, or carbonate.

For example, a sum of contents of either of or both of Si and Al contained in the sixth accessory ingredient may be 3.0 parts by mole or less, based on 100 parts by mole of the base material main ingredient.

In the case in which the content of the sixth accessory ingredient is more than 3.0 parts by mole, based on 100 parts by mole of the dielectric base material main ingredient, problems such as deterioration of sintering properties and density, the formation of a secondary phase, and the like, may occur.

h) Seventh Accessory Ingredient

According to an embodiment in the present disclosure, the dielectric ceramic composition may contain a seventh accessory ingredient containing one or more selected from a group consisting of oxides and carbonates of one or more elements among Bi, Li, and Cu.

A content of the seventh accessory ingredient is based on respective individual contents of Bi, Li, and Cu, regardless of the form of an addition such as that of oxide or carbonate.

The respective content of the element contained in the accessory ingredient among Bi, Li, and Cu may be 0.1 to 1 part by mole, based on 100 parts by mole of the base material main ingredient.

For example, when the seventh accessory ingredient contains Bi, the content of Bi may be 0.1 to 1 part by mole, based on 100 parts by mole of the base material main ingredient, when the seventh accessory ingredient contains Li, the content of Li may be 0.1 to 1 part by mole, based on 100 parts by mole of the base material main ingredient, and when the seventh accessory ingredient contains Cu, the content of Cu may be 0.1 to 1 part by mole, based on 100 parts by mole of the base material main ingredient.

In the case in which the respective content of one or more elements contained in the seventh accessory ingredient among Bi, Li, and Cu is 0.1 to 1 part by mole, based on 100 parts by mole of the base material main ingredient, a sintering temperature of the dielectric ceramic composition may be decreased. In the case in which the respective content of one or more elements contained in the seventh accessory ingredient among Bi, Li, and Cu is less than 0.1 part by mole, based on 100 parts by mole of the dielectric base material main ingredient, there is a negligible effect in decreasing a sintering temperature, and in the case in which the respective content is more than 1.0 part by mole, high-temperature withstand voltage characteristics may be deteriorated.

The dielectric ceramic composition according to an embodiment in the present disclosure may satisfy the X5R or X7R standard.

The dielectric ceramic composition according to an embodiment in the present disclosure may contain a base material main ingredient and an accessory ingredient. Here, the accessory ingredient contains one or more selected from a group consisting of a second accessory ingredient containing one or more of oxides and carbonates of a fixed-valence acceptor element including Mg and a fourth accessory ingredient containing one or more of oxides and carbonates of Ba, and a sixth accessory ingredient containing one or more selected from a group consisting of glass containing Si and oxides and carbonates of Si. Here, a content of Mg, based on 100 parts by mole of the base material main ingredient is defined as x, and a content ratio (Ba/Si) of Ba and Si is defined as y, Mg, Ba, and Si may be within a content range in which (x, y) is within the boundaries of upper and lower solid lines, based on a function (y=1.28−0.64x) illustrated in FIG. 1.

For example, with reference to FIG. 1, Mg, Ba, and Si may be contained within a content range represented as straight lines connecting points to one another at which (x, y) may be represented as A(0, 1.6), B(0.5, 1.28), C(1.0, 1.28), D(2.0, 0.64), E(2.0, 0), F(1.0, 0), G(0.5, 0.32), and H(0, 0.96), respectively, and contained to be within a region enclosed by the straight lines.

x refers to parts by mole of Mg, based on 100 parts by mole of the base material main ingredient, and y refers to a ratio of parts by mole of Si, based on 100 parts by mole of the base material main ingredient, with respect to parts by mole of Ba, based on 100 parts by mole of the base material main ingredient.

In the case in which the accessory ingredients are contained within a content range represented as the straight lines connecting the points A to G to one another and represented as the region enclosed by the straight lines, based on the base material main ingredient, the dielectric ceramic composition having a high degree of permittivity may be provided.

According to an embodiment in the present disclosure, there may be provided the dielectric ceramic composition containing Mg, Ba, and Si within a content range represented as the straight lines connecting points to one another at which (x, y) may be represented as A(0, 1.6), B(0.5, 1.28), C(1.0, 1.28), D(2.0, 0.64), E(2.0, 0), F(1.0, 0), G(0.5, 0.32), and H(0, 0.96), respectively, and within the region enclosed by the straight lines, and containing one or more elements among Bi, Li, and Cu as the seventh accessory ingredient. Here, the respective content of one or more elements contained as the seventh accessory ingredient among Bi, Li, and Cu is 0.1 to 1 part by mole, based on 100 parts by mole of the base material main ingredient.

At the time of applying the dielectric ceramic composition to a multilayer ceramic electronic component, the dielectric ceramic composition may be sintered at a temperature of 1130° C. or less and may be implemented so as to have permittivity of 4000 or more and enhanced high-temperature withstand voltage characteristics.

Figure 2:
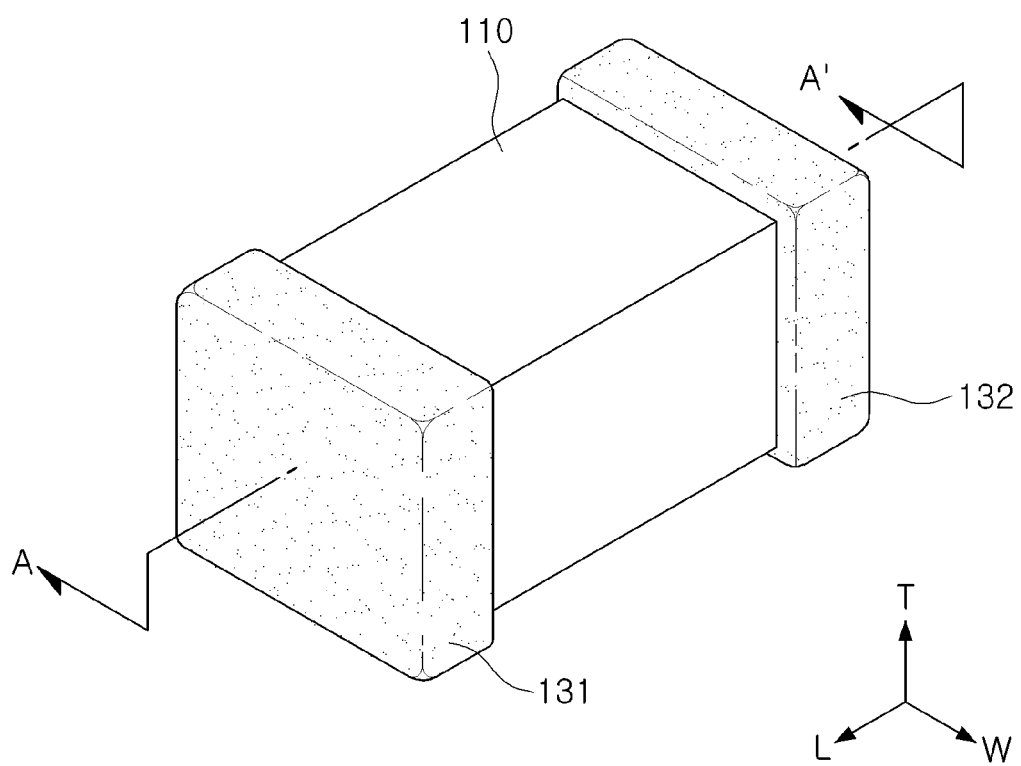
FIG. 2 is a schematic perspective view illustrating a multilayer ceramic capacitor according to another exemplary embodiment in the present disclosure.
Figure 3:
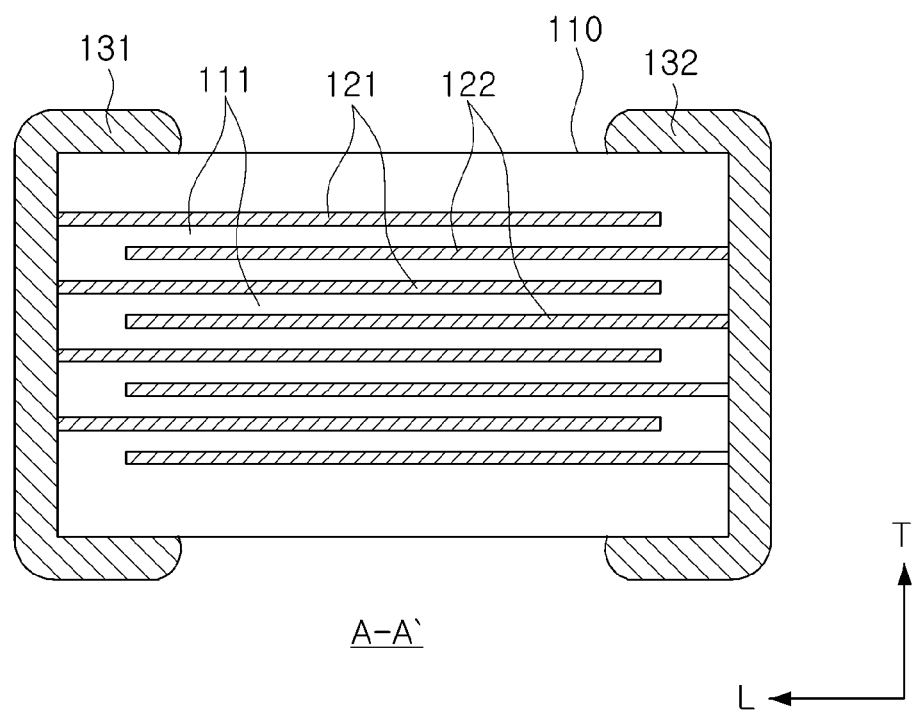
FIG. 3 is a schematic cross-sectional view illustrating the multilayer ceramic capacitor, taken along line A-A' of FIG. 2.

FIG. 2 is a schematic perspective view illustrating a multilayer ceramic capacitor 100 according to another embodiment in the present disclosure, and FIG. 3 is a schematic cross-sectional view of the multilayer ceramic capacitor 100, taken along line A-A' of FIG. 2.

Referring to FIGS. 2 and 3, the multilayer ceramic capacitor 100 according to another embodiment in the present disclosure may include a ceramic body 110 in which dielectric layers 111 and first and second internal electrodes 121 and 122 are alternately stacked. First and second external electrodes 131 and 132 electrically connected to the first and second internal electrodes 121 and 122 alternately disposed in the ceramic body 110, respectively, may be disposed on both end surfaces of the ceramic body 110, respectively.

A shape of the ceramic body 110 is not particularly limited, but may be a hexahedral shape. In addition, a dimension of the ceramic body is not particularly limited, and thus, the ceramic body may have an appropriate dimension according to the use. For example, the ceramic body may have a dimension of (0.6~5.6 mm)×(0.3~5.0 mm)×(0.3~1.9 mm).

A thickness of the dielectric layer 111 may be optionally changed according to a capacitance design of the capacitor. According to an embodiment in the present disclosure, a thickness of a single dielectric layer after sintering may be, for example, 0.2 µm or more.

In the case in which the dielectric layer has a relatively thin thickness, for example, an excessively thin thickness, an amount of grains present in the single dielectric layer is relatively small, causing a negative influence on reliability. Therefore, the thickness of the dielectric layer may be 0.2 µm or more.

The first and second internal electrodes 121 and 122 may be stacked so that end portions thereof are alternately exposed to both end surfaces of the ceramic body 110 opposing each other, respectively.

The first and second external electrodes 131 and 132 may be disposed on both end surfaces of the ceramic body 110, respectively, and electrically connected to the exposed end portions of the first and second internal electrodes 121 and 122, thereby configuring a capacitor circuit.

Although a conductive material contained in the first and second internal electrodes 121 and 122 is not particularly limited, since a material configuring the dielectric layer according to an embodiment in the present disclosure may have a form in which a paraelectric material and a ferroelectric material are mixed with each other or solid-dissolved, nickel (Ni) may be used.

A thickness of the first and second internal electrodes 121 and 122 may be appropriately determined according to the use, or the like, but is not particularly limited. For example, the thickness may be 0.1 to 5 µm, or 0.1 to 2.5 µm.

A conductive material contained in the first and second external electrodes 131 and 132 is not particularly limited, but nickel (Ni), copper (Cu), or an alloy thereof may be used.

A thickness of the first and second external electrodes 131 and 132 may be appropriately determined according to the use, or the like, but is not particularly limited. For example, the thickness may be 10 to 50 μm.

The dielectric layer 111 configuring the ceramic body 110 may contain the above-mentioned dielectric ceramic composition according to an embodiment in the present disclosure.

The dielectric ceramic composition may contain the base material main ingredient and the accessory ingredient, and the accessory ingredient may contain one or more selected from a group consisting of oxides and carbonates of one or more elements among Bi, Li, and Cu, and a respective content of one or more elements contained in the accessory ingredient among Bi, Li, and Cu may be 0.1 to 1 part by mole, based on 100 parts by mole of the base material main ingredient.

Since other features of the dielectric ceramic composition are the same as those of the above-mentioned dielectric ceramic composition according to the foregoing embodiment in the present disclosure, a detailed description thereof will be omitted.

According to an embodiment in the present disclosure, the dielectric ceramic composition having a relatively high degree of permittivity and good high-temperature withstand voltage characteristics under the same grain size conditions and having at a low temperature of 1130° C. or less may be provided. Further, in the case of the multilayer ceramic capacitor to which the dielectric ceramic composition according to an embodiment in the present disclosure is applied, the thickness of the dielectric layer may be increased as compared to the case in which an existing dielectric material is used, while implementing the same capacitance as that in an existing case. In addition, as smoothness of the internal electrode may be improved due to a decrease in the sintering temperature, excellent reliability and high-temperature withstand voltage characteristics may be maintained and the slimness of the dielectric layer may be implemented so that a super capacitance multilayer ceramic capacitor may be manufactured.

Hereinafter, the present disclosure will be described in detail through Embodiments and Comparative Examples according to the following Experimental Example to help a detailed understanding of the present disclosure. Therefore, the scope of the present disclosure is not limited to Embodiments.

EXPERIMENTAL EXAMPLE

A base material main component containing BaTiO and having an average grain size of about 150 nm as raw material powder and accessory ingredients having composition ratios illustrated in the following Tables 1, 3, 5, 7, 9, 11, and 13 were mixed with a dispersant and a binder using ethanol and toluene as solvents, and then ball-milled for 20 hours, thereby preparing a ceramic slurry.

A ceramic sheet having a thickness of about 3.5 μm and a ceramic sheet having a thickness of 10 to 13 μm were manufactured from the prepared slurry using a doctor blade type coater.

A nickel (Ni) internal electrode was printed on the ceramic sheet manufactured to have a thickness of about 3.5 μm among the ceramic sheets.

Upper and lower cover layers were manufactured by stacking 25 ceramic sheets having a thickness of 10 to 13 μm, and an active layer was manufactured by stacking 21 ceramic sheets on which the internal electrode was printed to thereby manufacture a bar, followed by pressing the manufactured bar. The pressed bar was cut into chips having a 3216 (length×width×thickness: about 3.2 mm×1.6 mm×1.6 mm) size using a cutter.

After the cut chip was plasticized and sintered at 1100 to 1250° C. for 2 hours under a reduction atmosphere (0.1% of $H_2$/99.9% of $N_2$, $H_2O/H_2/N_2$ atmosphere), the sintered chip was heat-treated by performing re-oxidation at about 1000° C. for 3 hours under a nitrogen ($N_2$) atmosphere.

The sintered chip was subjected to a termination process using a copper (Cu) paste and an electrode sintering process, thereby completing an external electrode. Therefore, a multilayer ceramic capacitor in which a grain size of a dielectric material after sintering is about 170 nm, a dielectric thickness is about 2.0 μm, and the number of dielectric layers disposed between the internal electrodes is 20 was manufactured.

Room-temperature capacitance, dielectric loss (DF), insulation resistance, temperature coefficient of capacitance (TCC), resistance degradation behavior according to a step voltage increase at a high temperature of 150° C., a sintering temperature, and the like, of the multilayer ceramic capacitor completed as described above were evaluated.

The Room-temperature capacitance and the dielectric loss of the multilayer ceramic capacitor (MLCC) chip were measured using a LCR-meter under the conditions of 1 kHz, AC 0.5 V/μm.

Permittivity (relative permittivity) of the multilayer ceramic capacitor (MLCC) chip was calculated from the capacitance, the dielectric thickness, an area of the internal electrode, the number of layers of the multilayer ceramic capacitor (MLCC) chip.

Room temperature insulation resistance (IR) was measured after 60 seconds in a state in which 10 samples are taken and DC of 10 V/μm is applied thereto.

The temperature coefficient of capacitance (TCC) according to a temperature was measured in a temperature range of −55 to 145° C.

In a high-temperature IR boosting test, the resistance degradation behavior was measured while increasing respective step voltages by DC 5 V/μm at 150° C. and resistance values were measured every 5 seconds, and the time of a respective step is 10 minutes.

The high-temperature withstand voltage was derived from the high-temperature IR boosting test. Here, the high-temperature withstand voltage indicates a voltage at which IR withstands $10^5 \Omega$ or more when the high-temperature withstand voltage was measured by applying the step voltage of DC 5 V/μm to a 3216 sized chip at 150° C. for 10 minutes and continuously increasing the step voltage, wherein the 3216 size chip has 20 dielectric layers having a thickness about 2 μm after sintering.

A RC value is obtained through a product of a room-temperature capacitance value measured at AC 0.5 V/μm and 1 kHz and an insulation resistance value measured at DC 10 V/μm.

Characteristics of a proto-type multilayer ceramic capacitor (MLCC) chip formed using the dielectric ceramic compositions having compositions described in Tables 1, 3, 5, 7, 9, 11, and 13 were illustrated in Tables 2, 4, 6, 8, 10, 12, and 14, respectively.

TABLE 1

Number of Moles of Respective Additive Based on 100 Moles of Base Material
Main Ingredient BaTiO$_3$

| Experimental Example | First Accessory Ingredient MnO$_2$ | V$_2$O$_5$ | Second Accessory Ingredient MgCO$_3$ | Third Accessory Ingredient Y$_2$O$_3$ | Fourth Accessory Ingredient BaCO$_3$ | Fifth Accessory Ingredient Ca | Zr | Sixth Accessory Ingredient Al$_2$O$_3$ | SiO$_2$ | Seventh Accessory Ingredient Bi$_2$O$_3$ | Li$_2$O$_3$ | CuO | Ba/Si |
|---|---|---|---|---|---|---|---|---|---|---|---|---|---|
| 1 | 0.200 | 0.100 | 0.00 | 0.30 | 0.00 | 1.00 | 1.00 | 0.20 | 1.25 | 0.00 | 0.00 | 0.00 | 0.00 |
| 2 | 0.200 | 0.100 | 0.00 | 0.30 | 0.40 | 1.00 | 1.00 | 0.20 | 1.25 | 0.00 | 0.00 | 0.00 | 0.32 |
| 3 | 0.200 | 0.100 | 0.00 | 0.30 | 0.80 | 1.00 | 1.00 | 0.20 | 1.25 | 0.00 | 0.00 | 0.00 | 0.64 |
| 4 | 0.200 | 0.100 | 0.00 | 0.30 | 1.20 | 1.00 | 1.00 | 0.20 | 1.25 | 0.00 | 0.00 | 0.00 | 0.96 |
| 5 | 0.200 | 0.100 | 0.00 | 0.30 | 1.40 | 1.00 | 1.00 | 0.20 | 1.25 | 0.00 | 0.00 | 0.00 | 1.12 |
| 6 | 0.200 | 0.100 | 0.00 | 0.30 | 1.60 | 1.00 | 1.00 | 0.20 | 1.25 | 0.00 | 0.00 | 0.00 | 1.28 |
| 7 | 0.200 | 0.100 | 0.00 | 0.30 | 1.80 | 1.00 | 1.00 | 0.20 | 1.25 | 0.00 | 0.00 | 0.00 | 1.44 |
| 8 | 0.200 | 0.100 | 0.00 | 0.30 | 2.00 | 1.00 | 1.00 | 0.20 | 1.25 | 0.00 | 0.00 | 0.00 | 1.60 |
| 9 | 0.200 | 0.100 | 0.00 | 0.30 | 2.20 | 1.00 | 1.00 | 0.20 | 1.25 | 0.00 | 0.00 | 0.00 | 1.76 |
| 10 | 0.200 | 0.100 | 0.00 | 0.30 | 2.40 | 1.00 | 1.00 | 0.20 | 1.25 | 0.00 | 0.00 | 0.00 | 1.92 |
| 11 | 0.200 | 0.100 | 0.00 | 0.00 | 1.60 | 1.00 | 1.00 | 0.20 | 1.25 | 0.00 | 0.00 | 0.00 | 1.28 |
| 12 | 0.200 | 0.100 | 0.00 | 0.15 | 1.60 | 1.00 | 1.00 | 0.20 | 1.25 | 0.00 | 0.00 | 0.00 | 1.28 |
| 13 | 0.200 | 0.100 | 0.00 | 0.50 | 1.60 | 1.00 | 1.00 | 0.20 | 1.25 | 0.00 | 0.00 | 0.00 | 1.28 |
| 14 | 0.200 | 0.100 | 0.00 | 1.00 | 1.60 | 1.00 | 1.00 | 0.20 | 1.25 | 0.00 | 0.00 | 0.00 | 1.28 |
| 15 | 0.200 | 0.100 | 0.00 | 2.00 | 1.60 | 1.00 | 1.00 | 0.20 | 1.25 | 0.00 | 0.00 | 0.00 | 1.28 |
| 16 | 0.050 | 0.025 | 0.00 | 0.30 | 1.60 | 1.00 | 1.00 | 0.20 | 1.25 | 0.00 | 0.00 | 0.00 | 1.28 |
| 17 | 1.000 | 0.500 | 0.00 | 0.30 | 1.60 | 1.00 | 1.00 | 0.20 | 1.25 | 0.00 | 0.00 | 0.00 | 1.28 |
| 18 | 0.200 | 0.100 | 0.00 | 0.30 | 1.60 | 0.00 | 0.00 | 0.20 | 1.25 | 0.00 | 0.00 | 0.00 | 1.28 |
| 19 | 0.200 | 0.100 | 0.00 | 0.30 | 1.60 | 10.0 | 10.0 | 0.20 | 1.25 | 0.00 | 0.00 | 0.00 | 1.28 |

TABLE 2

| Experimental Example | Characteristics of Proto-type Chip | | | | | | | Characteristics Evaluation | | |
|---|---|---|---|---|---|---|---|---|---|---|
| | Permittivity | DF (%) | RC (ΩF) | TCC (%) (85° C.) | TCC (%) (125° C.) | High-Temperature Withstand Voltage (V/μm) | Sintering Temperature (° C.) | Permittivity | High-Temperature Withstand Voltage | Sintering Property |
| 1 | 2633 | 4.55 | 3124 | −8.5 | −18.5 | 60 | 1150 | X | ○ | Δ |
| 2 | 2752 | 5.12 | 3325 | −8.2 | −22.4 | 60 | 1150 | X | ○ | Δ |
| 3 | 3000 | 5.47 | 3007 | −7.8 | −19.5 | 60 | 1150 | Δ | ○ | Δ |
| 4 | 3128 | 6.11 | 3457 | −6.5 | −19.1 | 60 | 1150 | ○ | ○ | Δ |
| 5 | 3611 | 6.58 | 2955 | −7.7 | −21.4 | 60 | 1150 | ○ | ○ | Δ |
| 6 | 4112 | 6.61 | 3287 | −8.4 | −22.0 | 65 | 1150 | ○ | ○ | Δ |
| 7 | 3596 | 6.28 | 2845 | −8.7 | −24.5 | 60 | 1150 | ○ | ○ | Δ |
| 8 | 3174 | 6.00 | 3250 | −6.8 | −19.5 | 65 | 1150 | ○ | ○ | Δ |
| 9 | 2422 | 5.77 | 2963 | −6.1 | −21.4 | 60 | 1150 | X | ○ | Δ |
| 10 | 2084 | 5.62 | 2885 | −7.8 | −25.4 | 55 | 1150 | X | ○ | Δ |
| 11 | 3745 | 6.65 | 2789 | −7.2 | −22.2 | 50 | 1150 | ○ | ○ | Δ |
| 12 | 3842 | 6.12 | 2856 | −9.5 | −19.4 | 60 | 1150 | ○ | ○ | Δ |
| 13 | 3723 | 6.58 | 2936 | −8.8 | −20.3 | 55 | 1150 | ○ | ○ | Δ |
| 14 | 3001 | 6.03 | 3001 | −7.6 | −20.4 | 40 | 1150 | ○ | ○ | Δ |
| 15 | 2845 | 5.74 | 3455 | −8.1 | −19.7 | 30 | 1150 | X | Δ | Δ |
| 16 | 4231 | 8.03 | 3287 | −8.3 | −19.6 | 30 | 1150 | ○ | Δ | Δ |
| 17 | 2845 | 4.56 | 4896 | −7.1 | −15.4 | 75 | 1150 | X | ○ | Δ |
| 18 | 3748 | 5.97 | 3216 | −7.8 | −18.6 | 55 | 1150 | ○ | ○ | Δ |
| 19 | 3024 | 4.88 | 3687 | −8.1 | −19.5 | 60 | 1150 | Δ | ○ | Δ |

○ indicates "good",
Δ indicates "fair", and
X indicates "defective".

Table 1 illustrates compositions in which a content of the second accessory ingredient (MgCO$_3$) is 0 mole based on 100 moles of BaTiO$_3$, and Table 2 illustrates characteristics of the proto-type chips having the compositions of Table 1. Referring to Experimental Examples 1 to 10, as a Ba/Si ratio, which is a content ratio of a fourth accessory ingredient (Ba) and a sixth accessory ingredient (Si), was increased in a state in which contents of the remaining ingredients were fixed, permittivity was increased, such that in Experimental Example 6 in which the Ba/Si ratio was 1.28, maximum permittivity of 4112 was measured, but when the Ba/Si ratio was further increased, permittivity tended to be decreased. In the case in which the Ba/Si ratio was 0.64 or less as in Experimental Example 3 or the case in which the Ba/Si ratio was 1.76 or more as in Experimental Example 9, permittivity was decreased to 3000 or less. Therefore, in Table 1, it may be appreciated that in the case in which the content of the second accessory ingredient Mg was 0 mole, based on 100 moles of the base material main ingredient, when the Ba/Si was in a range of 0.96 to 1.60, a relatively high degree of permittivity may be implemented. In addition, the high-temperature withstand voltage characteristics were also good (60 V/μm or more) in this composition range.

Further, in Table 1, Experimental Examples 6 and 11 to 15 illustrate a change in a content of the third accessory ingredient (Y$_2$O$_3$) under the condition in which the Ba/Si ratio was 1.28 and the remaining ingredients except for the third accessory ingredients were the same, and Table 2 illustrates characteristics of the proto-type chip characteristics corresponding thereto. As a content of Y was increased from 0 mole, permittivity was increased, such that in Experimental Example 6 in which the content of Y$_2$O$_3$ was 0.3 mole, the maximum permittivity of 4112 was measured, but when the content of Y$_2$O$_3$ was further increased, permittivity was decreased, such that in the case in which the content of Y$_2$O$_3$ was 2 moles, permittivity was decreased to about 2945. In the case of the high-temperature withstand voltage characteristics, when the content of Y$_2$O$_3$ was 0.15 to 0.3 mole, the high-temperature withstand voltage characteristics were good (about 60 to 65 V/μm) and when the content was less than or more than the above-mentioned range, the high-temperature withstand voltage was also decreased. Therefore, the content of Y$_2$O$_3$ in which a high degree of permittivity is implemented and high-temperature withstand voltage characteristics are good may be in a range of 0 to 2.0 moles, based on 100 moles of the base material main ingredient.

Experimental Examples 16 and 17 of Table 1 illustrate Experimental Examples in cases in which a content of a first accessory ingredient is low (MnO$_2$: 0.05 mole and V$_2$O$_5$: 0.025 mole) and excessively high (MnO$_2$: 1.0 mole and V$_2$O$_5$: 0.5 mole) under the condition in which the Ba/Si ratio was 1.28 and contents of the remaining ingredients were equal to each other, and Table 2 illustrates characteristics of the proto-type chip corresponding thereto. In Experimental Example 16 in which the content of the first accessory ingredient was relatively low, high-temperature withstand voltage characteristics were low (30 V/μm), and in the case in which the content of the first accessory ingredient was excessively higher than a suitable content as in Experimental Example 17, permittivity was decreased to 3000 or less. Therefore, on the basis of a sum of contents of elements of the first accessory ingredient, the content of the first accessory ingredient in which a high degree of permittivity may be implemented and high-temperature withstand voltage characteristics may be good may be in a range of 0.1 mole (corresponding to 0.05 mole of MnO$_2$ and 0.025 mole of V$_2$O$_5$) to 2.0 moles (corresponding to 1.0 mole of MnO$_2$ and 0.5 mole of V$_2$O$_5$), based on 100 moles of the base material main ingredient (BaTiO$_3$).

Experimental Examples 18 and 19 of Table 1 illustrate compositions in the cases in which a content of a fifth accessory ingredient was low (CaCO$_3$: 0 mole and ZrO$_2$: 0 mole) and excessively high (CaCO$_3$ of 10 mole and ZrO$_2$ of 10 mole), respectively, under the condition in which the Ba/Si ratio was 1.28 and contents of the remaining ingredients were equal, and Table 2 illustrates characteristics of the proto-type chip corresponding thereto. In Experimental Example 19 in which the content of the fifth accessory ingredient was excessively high, permittivity was decreased to about 3024. Therefore, the content of the fifth accessory ingredient in which a high degree of permittivity may be implemented and high-temperature withstand voltage characteristics may be good may be 20 moles or less, based on 100 moles of the base material main ingredient (BaTiO$_3$).

In addition, it may be appreciated that in all of the Experimental Examples of Table 1, since TCC at 85° C. is less than ±15% under the measurement condition in which a high AC electric field of AC 0.5 V/μm is applied thereto, an X5R standard is satisfied.

TABLE 3

Number of Moles of Respective Additive Based on 100 Moles of Base Material Main Ingredient BaTiO$_3$

| Experimental Example | First Accessory Ingredient | | Second Accessory Ingredient | Third Accessory Ingredient | Fourth Accessory Ingredient | Fifth Accessory Ingredient | | Sixth Accessory Ingredient | | Seventh Accessory Ingredient | | | Ba/Si |
|---|---|---|---|---|---|---|---|---|---|---|---|---|---|
| | MnO$_2$ | V$_2$O$_5$ | MgCO$_3$ | Y$_2$O$_3$ | BaCO$_3$ | Ca | Zr | Al$_2$O$_3$ | SiO$_2$ | Bi$_2$O$_3$ | Li$_2$O$_3$ | CuO | |
| 20 | 0.200 | 0.100 | 0.50 | 0.30 | 0.00 | 1.00 | 1.00 | 0.20 | 1.25 | 0.00 | 0.00 | 0.00 | 0.00 |
| 21 | 0.200 | 0.100 | 0.50 | 0.30 | 0.40 | 1.00 | 1.00 | 0.20 | 1.25 | 0.00 | 0.00 | 0.00 | 0.32 |
| 22 | 0.200 | 0.100 | 0.50 | 0.30 | 0.80 | 1.00 | 1.00 | 0.20 | 1.25 | 0.00 | 0.00 | 0.00 | 0.64 |
| 23 | 0.200 | 0.100 | 0.50 | 0.30 | 1.20 | 1.00 | 1.00 | 0.20 | 1.25 | 0.00 | 0.00 | 0.00 | 0.96 |
| 24 | 0.200 | 0.100 | 0.50 | 0.30 | 1.40 | 1.00 | 1.00 | 0.20 | 1.25 | 0.00 | 0.00 | 0.00 | 1.12 |
| 25 | 0.200 | 0.100 | 0.50 | 0.30 | 1.60 | 1.00 | 1.00 | 0.20 | 1.25 | 0.00 | 0.00 | 0.00 | 1.28 |
| 26 | 0.200 | 0.100 | 0.50 | 0.30 | 1.80 | 1.00 | 1.00 | 0.20 | 1.25 | 0.00 | 0.00 | 0.00 | 1.44 |
| 27 | 0.200 | 0.100 | 0.50 | 0.30 | 2.00 | 1.00 | 1.00 | 0.20 | 1.25 | 0.00 | 0.00 | 0.00 | 1.60 |
| 28 | 0.200 | 0.100 | 0.50 | 0.30 | 2.20 | 1.00 | 1.00 | 0.20 | 1.25 | 0.00 | 0.00 | 0.00 | 1.76 |
| 29 | 0.200 | 0.100 | 0.50 | 0.30 | 2.40 | 1.00 | 1.00 | 0.20 | 1.25 | 0.00 | 0.00 | 0.00 | 1.92 |

TABLE 4

| Experimental Example | Characteristics of Proto-type Chip | | | | | | | Characteristics Evaluation | | |
|---|---|---|---|---|---|---|---|---|---|---|
| | Permittivity | DF (%) | RC (ΩF) | TCC(%) (85° C.) | TCC (%) (125° C.) | High-Temperature Withstand Voltage (V/μm) | Sintering Temperature (° C.) | Permittivity | High-Temperature Withstand Voltage | Sintering Property |
| 20 | 2806 | 5.64 | 3125 | −8.1 | −26.5 | 60 | 1150 | x | ○ | Δ |
| 21 | 3455 | 5.90 | 3364 | −8.2 | −22.4 | 60 | 1150 | ○ | ○ | Δ |
| 22 | 3842 | 6.42 | 3458 | −8.8 | −19.5 | 65 | 1150 | ○ | ○ | Δ |
| 23 | 4005 | 6.50 | 3697 | −6.5 | −19.1 | 65 | 1150 | ○ | ○ | Δ |
| 24 | 3812 | 6.42 | 3285 | −7.7 | −21.4 | 65 | 1150 | ○ | ○ | Δ |
| 25 | 3225 | 5.84 | 2947 | −8.4 | −22.0 | 60 | 1150 | ○ | ○ | Δ |
| 26 | 2964 | 5.69 | 3145 | −8.7 | −24.5 | 55 | 1150 | ○ | ○ | Δ |

TABLE 4-continued

| | Characteristics of Proto-type Chip | | | | | | | Characteristics Evaluation | | |
|---|---|---|---|---|---|---|---|---|---|---|
| Experimental Example | Permittivity | DF (%) | RC (ΩF) | TCC(%) (85° C.) | TCC (%) (125° C.) | High-Temperature Withstand Voltage (V/μm) | Sintering Temperature (° C.) | Permittivity | High-Temperature Withstand Voltage | Sintering Property |
| 27 | 2456 | 5.23 | 3546 | −5.9 | −19.5 | 55 | 1150 | x | ○ | Δ |
| 28 | 2187 | 5.17 | 3110 | −6.1 | −21.4 | 55 | 1150 | x | ○ | Δ |
| 29 | 1964 | 4.84 | 2945 | −7.8 | −25.4 | 50 | 1150 | x | ○ | Δ |

○ indicates "good",
Δ indicates "fair", and
x indicates "defective".

Table 3 illustrates compositions in which the content of the second accessory ingredient (MgCO₃) was 0.5 mole, based on 100 moles of the base material main ingredient (BaTiO₃), and Table 4 illustrates characteristics of the proto-type chips corresponding to these compositions. In Experimental Examples 20 to 29, as the Ba/Si ratio, which is the content ratio of the fourth accessory ingredient (Ba) and the sixth accessory ingredient (Si), was increased from 0 in a state in which contents of the remaining ingredients were fixed, permittivity was increased, such that in Experimental Example 23 in which the Ba/Si ratio was 0.96, maximum permittivity of 4005 was measured, but when the Ba/Si ratio was further increased, permittivity tended to be decreased. In the case in which the Ba/Si ratio was 0 (Experimental Example 20) or the case in which the Ba/Si ratio was 1.6 (Experimental Example 27) or more, permittivity was decreased to 3000 or less. Therefore, in the case in which the content of Mg of the second accessory ingredient was 0.5 mole, based on 100 moles of the base material main ingredient, when the Ba/Si ratio was in a range of 0.32 to 1.44, a relatively high degree of permittivity was implemented. In addition, the high-temperature withstand voltage characteristics were good (60 V/μm or more) in this composition range. Further, it may be appreciated that in all of the Experimental Examples of Table 3, since TCC at 85° C. is less than ±15% under the measurement condition in which a high AC electric field of AC 0.5 V/μm is applied thereto, the X5R standard is satisfied.

TABLE 5

| | Number of Moles of Respective Additive Based on 100 Moles of Base Material Main Ingredient BaTiO₃ | | | | | | | | | | | |
|---|---|---|---|---|---|---|---|---|---|---|---|---|
| | First Accessory Ingredient | | Second Accessory Ingredient | Third Accessory Ingredient | Fourth Accessory Ingredient | Fifth Accessory Ingredient | | Sixth Accessory Ingredient | | Seventh Accessory Ingredient | | |
| Experimental Example | MnO₂ | V₂O₅ | MgCO₃ | Y₂O₃ | BaCO₃ | Ca | Zr | Al₂O₃ | SiO₂ | Bi₂O₃ | Li₂O₃ | CuO |
| 30 | 0.200 | 0.100 | 1.00 | 0.30 | 0.00 | 1.00 | 1.00 | 0.20 | 1.25 | 0.00 | 0.00 | 0.00 |
| 31 | 0.200 | 0.100 | 1.00 | 0.30 | 0.40 | 1.00 | 1.00 | 0.20 | 1.25 | 0.00 | 0.00 | 0.00 |
| 32 | 0.200 | 0.100 | 1.00 | 0.30 | 0.80 | 1.00 | 1.00 | 0.20 | 1.25 | 0.00 | 0.00 | 0.00 |
| 33 | 0.200 | 0.100 | 1.00 | 0.30 | 1.20 | 1.00 | 1.00 | 0.20 | 1.25 | 0.00 | 0.00 | 0.00 |
| 34 | 0.200 | 0.100 | 1.00 | 0.30 | 1.40 | 1.00 | 1.00 | 0.20 | 1.25 | 0.00 | 0.00 | 0.00 |
| 35 | 0.200 | 0.100 | 1.00 | 0.30 | 1.60 | 1.00 | 1.00 | 0.20 | 1.25 | 0.00 | 0.00 | 0.00 |
| 36 | 0.200 | 0.100 | 1.00 | 0.30 | 1.80 | 1.00 | 1.00 | 0.20 | 1.25 | 0.00 | 0.00 | 0.00 |
| 37 | 0.200 | 0.100 | 1.00 | 0.30 | 2.00 | 1.00 | 1.00 | 0.20 | 1.25 | 0.00 | 0.00 | 0.00 |
| 38 | 0.200 | 0.100 | 1.00 | 0.30 | 2.20 | 1.00 | 1.00 | 0.20 | 1.25 | 0.00 | 0.00 | 0.00 |
| 39 | 0.200 | 0.100 | 1.00 | 0.30 | 2.40 | 1.00 | 1.00 | 0.20 | 1.25 | 0.00 | 0.00 | 0.00 |

TABLE 6

| | Characteristics of Proto-type Chip | | | | | | | Characteristics Evaluation | | |
|---|---|---|---|---|---|---|---|---|---|---|
| Experimental Example | Permittivity | DF (%) | RC (ΩF) | TCC(%) (85° C.) | TCC (%) (125° C.) | High-Temperature Withstand Voltage (V/μm) | Sintering Temperature (° C.) | Permittivity | High-Temperature Withstand Voltage | Sintering Property |
| 30 | 3110 | 6.07 | 3325 | −9.3 | −22.7 | 55 | 1150 | ○ | ○ | Δ |
| 31 | 3685 | 6.12 | 3126 | −9.4 | −22.6 | 65 | 1150 | ○ | ○ | Δ |
| 32 | 4224 | 6.67 | 3478 | −9.0 | −21.5 | 60 | 1150 | ○ | ○ | Δ |
| 33 | 3965 | 6.54 | 2986 | −9.7 | −19.8 | 60 | 1150 | ○ | ○ | Δ |
| 34 | 3502 | 6.38 | 3478 | −9.4 | −20.8 | 60 | 1150 | ○ | ○ | Δ |
| 35 | 3129 | 5.98 | 2988 | −9.6 | −20.7 | 55 | 1150 | ○ | ○ | Δ |
| 36 | 2968 | 5.64 | 3325 | −8.7 | −21.8 | 55 | 1150 | Δ | ○ | Δ |
| 37 | 2456 | 5.12 | 3250 | −8.6 | −22.4 | 50 | 1150 | x | ○ | Δ |

TABLE 6-continued

| | Characteristics of Proto-type Chip | | | | | | | Characteristics Evaluation | | |
|---|---|---|---|---|---|---|---|---|---|---|
| Experimental Example | Permittivity | DF (%) | RC (ΩF) | TCC(%) (85° C.) | TCC (%) (125° C.) | High-Temperature Withstand Voltage (V/μm) | Sintering Temperature (° C.) | Permittivity | High-Temperature Withstand Voltage | Sintering Property |
| 38 | 2006 | 4.87 | 3125 | −8.1 | −22.5 | 50 | 1150 | x | ○ | Δ |
| 39 | 1847 | 4.25 | 2745 | −8.4 | −21.7 | 45 | 1150 | x | ○ | Δ |

○ indicates "good",
Δ indicates "fair", and
x indicates "defective".

Table 5 illustrates compositions in which the content of the second accessory ingredient ($MgCO_3$) is 1.0 mole, based on 100 moles of $BaTiO_3$, and Table 6 illustrates characteristics of the proto-type chips corresponding to these compositions. Referring to Experimental Examples 30 to 39, as the Ba/Si ratio, which is the content ratio of the fourth accessory ingredient (Ba) and the sixth accessory ingredient (Si), was increased from 0 in a state in which contents of the remaining ingredients were fixed, permittivity was increased, such that in Experimental Example 32 in which the Ba/Si ratio was 0.64, maximum permittivity of 4224 was measured, but when the Ba/Si ratio was further increased, permittivity tended to be decreased.

In the case in which the Ba/Si ratio was 1.44 (Experimental Example 36) or more, permittivity was decreased to 3000 or less. Therefore, in the case in which the content of Mg of the second accessory ingredient was 1.0 mole, based on 100 moles of the base material main ingredient, when the Ba/Si ratio was in a range of 0 to 1.44, a high degree of permittivity was implemented. In addition, the high-temperature withstand voltage characteristics were good (60 V/μm or more) in this composition range. Further, it may be appreciated that in all of the Experimental Examples of Table 3, since TCC at 85° C. is less than ±15% under the measurement condition in which a high AC electric field of AC 0.5 V/μm is applied thereto, X5R standard is satisfied.

TABLE 7

Number of Moles of Respective Additive Based on 100 Moles of Base Material Main Ingredient $BaTiO_3$

| Experimental Example | First Accessory Ingredient | | Second Accessory Ingredient | Third Accessory Ingredient | Fourth Accessory Ingredient | Fifth Accessory Ingredient | | Sixth Accessory Ingredient | | Seventh Accessory Ingredient | | | Ba/Si |
|---|---|---|---|---|---|---|---|---|---|---|---|---|---|
| | $MnO_2$ | $V_2O_5$ | $MgCO_3$ | $Y_2O_3$ | $BaCO_3$ | Ca | Zr | $Al_2O_3$ | $SiO_2$ | $Bi_2O_3$ | $Li_2O_3$ | CuO | |
| 40 | 0.200 | 0.100 | 1.50 | 0.30 | 0.00 | 1.00 | 1.00 | 0.20 | 1.25 | 0.00 | 0.00 | 0.00 | 0.00 |
| 41 | 0.200 | 0.100 | 1.50 | 0.30 | 0.40 | 1.00 | 1.00 | 0.20 | 1.25 | 0.00 | 0.00 | 0.00 | 0.32 |
| 42 | 0.200 | 0.100 | 1.50 | 0.30 | 0.80 | 1.00 | 1.00 | 0.20 | 1.25 | 0.00 | 0.00 | 0.00 | 0.64 |
| 43 | 0.200 | 0.100 | 1.50 | 0.30 | 1.20 | 1.00 | 1.00 | 0.20 | 1.25 | 0.00 | 0.00 | 0.00 | 0.96 |
| 44 | 0.200 | 0.100 | 1.50 | 0.30 | 1.40 | 1.00 | 1.00 | 0.20 | 1.25 | 0.00 | 0.00 | 0.00 | 1.12 |
| 45 | 0.200 | 0.100 | 1.50 | 0.30 | 1.60 | 1.00 | 1.00 | 0.20 | 1.25 | 0.00 | 0.00 | 0.00 | 1.28 |
| 46 | 0.200 | 0.100 | 1.50 | 0.30 | 1.80 | 1.00 | 1.00 | 0.20 | 1.25 | 0.00 | 0.00 | 0.00 | 1.44 |
| 47 | 0.200 | 0.100 | 1.50 | 0.30 | 2.00 | 1.00 | 1.00 | 0.20 | 1.25 | 0.00 | 0.00 | 0.00 | 1.60 |
| 48 | 0.200 | 0.100 | 1.50 | 0.30 | 2.20 | 1.00 | 1.00 | 0.20 | 1.25 | 0.00 | 0.00 | 0.00 | 1.76 |
| 49 | 0.200 | 0.100 | 1.50 | 0.30 | 2.40 | 1.00 | 1.00 | 0.20 | 1.25 | 0.00 | 0.00 | 0.00 | 1.92 |

TABLE 8

| | Characteristics of Proto-type Chip | | | | | | | Characteristics Evaluation | | |
|---|---|---|---|---|---|---|---|---|---|---|
| Experimental Example | Permittivity | DF (%) | RC (ΩF) | TCC (%) (85° C.) | TCC (%) (125° C.) | High-Temperature Withstand Voltage (V/μm) | Sintering Temperature (° C.) | Permittivity | High-Temperature Withstand Voltage | Sintering Property |
| 40 | 3496 | 6.23 | 3125 | −9.5 | −21.4 | 60 | 1150 | ○ | ○ | Δ |
| 41 | 3845 | 6.48 | 3623 | −9.6 | −22.5 | 60 | 1150 | ○ | ○ | Δ |
| 42 | 3254 | 6.15 | 3425 | −9.4 | −22.7 | 60 | 1150 | ○ | ○ | Δ |
| 43 | 3025 | 5.98 | 3002 | −9.2 | −20.8 | 55 | 1150 | ○ | ○ | Δ |
| 44 | 2875 | 5.64 | 2975 | −8.7 | −20.4 | 55 | 1150 | Δ | ○ | Δ |
| 45 | 2563 | 5.23 | 2849 | −9.8 | −19.4 | 55 | 1150 | x | ○ | Δ |
| 46 | 2354 | 5.21 | 2968 | −9.3 | −19.2 | 55 | 1150 | x | ○ | Δ |

TABLE 8-continued

| | | | | | | Characteristics of Proto-type Chip | | | Characteristics Evaluation | | |
|---|---|---|---|---|---|---|---|---|---|---|---|
| Experimental Example | Permittivity | DF (%) | RC (ΩF) | TCC (%) (85° C.) | TCC (%) (125° C.) | High-Temperature Withstand Voltage (V/μm) | Sintering Temperature (° C.) | Permittivity | High-Temperature Withstand Voltage | Sintering Property |
| 47 | 2087 | 4.99 | 3046 | −8.8 | −20.8 | 50 | 1150 | x | ○ | Δ |
| 48 | 1978 | 4.87 | 3214 | −9.3 | −20.3 | 50 | 1150 | x | ○ | Δ |
| 49 | 1882 | 4.56 | 2681 | −8.5 | −20.6 | 45 | 1150 | x | ○ | Δ |

○ indicates "good",
Δ indicates "fair", and
x indicates "defective".

Table 7 illustrates compositions in which the content of the second accessory ingredient (MgCO$_3$) is 1.5 moles, based on 100 moles of BaTiO$_3$, and Table 8 illustrates characteristics of the proto-type chips corresponding to these compositions. In Experimental Examples 40 to 49, in Experimental Example 41 in which the Ba/Si ratio, which is the content ratio of the fourth accessory ingredient (Ba) and the sixth accessory ingredient (Si), was 0.32 in a state in which contents of the remaining ingredients were fixed, maximum permittivity of 3845 was measured, but when the Ba/Si ratio was further increased, permittivity tended to be decreased. In the case in which the Ba/Si ratio was 1.12 (Experimental Example 44) or more permittivity was decreased to 3000 or less. Therefore, in the case in which the content of Mg of the second accessory ingredient was 1.5 moles, based on 100 moles of the dielectric base material main ingredient, when the Ba/Si ratio was in a range of 0 to 0.96, a relatively high degree of permittivity was implemented. In addition, the high-temperature withstand voltage characteristics were good (60 V/μm or more) in this composition range. In addition, it may be appreciated that in all of the Experimental Examples of Table 7, since TCC at 85° C. was less than ±15% under the measurement condition in which a high level of AC electric field of AC 0.5 V/μm was applied, X5R standard was satisfied.

TABLE 9

Number of Moles of Respective Additive Based on 100 Moles of Base Material Main Ingredient BaTiO$_3$

| Experimental Example | First Accessory Ingredient | | Second Accessory Ingredient | Third Accessory Ingredient | Fourth Accessory Ingredient | Fifth Accessory Ingredient | | Sixth Accessory Ingredient | | Seventh Accessory Ingredient | | |
|---|---|---|---|---|---|---|---|---|---|---|---|---|
| | MnO$_2$ | V$_2$O$_5$ | MgCO$_3$ | Y$_2$O$_3$ | BaCO$_3$ | Ca | Zr | Al$_2$O$_3$ | SiO$_2$ | Bi$_2$O$_3$ | Li$_2$O$_3$ | CuO |
| 50 | 0.200 | 0.100 | 2.00 | 0.30 | 0.00 | 1.00 | 1.00 | 0.20 | 1.25 | 0.00 | 0.00 | 0.00 |
| 51 | 0.200 | 0.100 | 2.00 | 0.30 | 0.40 | 1.00 | 1.00 | 0.20 | 1.25 | 0.00 | 0.00 | 0.00 |
| 52 | 0.200 | 0.100 | 2.00 | 0.30 | 0.80 | 1.00 | 1.00 | 0.20 | 1.25 | 0.00 | 0.00 | 0.00 |
| 53 | 0.200 | 0.100 | 2.00 | 0.30 | 1.20 | 1.00 | 1.00 | 0.20 | 1.25 | 0.00 | 0.00 | 0.00 |
| 54 | 0.200 | 0.100 | 2.00 | 0.30 | 1.40 | 1.00 | 1.00 | 0.20 | 1.25 | 0.00 | 0.00 | 0.00 |
| 55 | 0.200 | 0.100 | 2.00 | 0.30 | 1.60 | 1.00 | 1.00 | 0.20 | 1.25 | 0.00 | 0.00 | 0.00 |
| 56 | 0.200 | 0.100 | 2.00 | 0.30 | 1.80 | 1.00 | 1.00 | 0.20 | 1.25 | 0.00 | 0.00 | 0.00 |
| 57 | 0.200 | 0.100 | 2.00 | 0.30 | 2.00 | 1.00 | 1.00 | 0.20 | 1.25 | 0.00 | 0.00 | 0.00 |
| 58 | 0.200 | 0.100 | 2.00 | 0.30 | 2.20 | 1.00 | 1.00 | 0.20 | 1.25 | 0.00 | 0.00 | 0.00 |
| 59 | 0.200 | 0.100 | 2.00 | 0.30 | 2.40 | 1.00 | 1.00 | 0.20 | 1.25 | 0.00 | 0.00 | 0.00 |

TABLE 10

| | | | | | | Characteristics of Proto-type Chip | | | Characteristics Evaluation | | |
|---|---|---|---|---|---|---|---|---|---|---|---|
| Experimental Example | Permittivity | DF (%) | RC (ΩF) | TCC (%) (85° C.) | TCC (%) (125° C.) | High-Temperature Withstand Voltage (V/μm) | Sintering Temperature (° C.) | Permittivity | High-Temperature Withstand Voltage | Sintering Property |
| 50 | 3605 | 6.25 | 3005 | −10.2 | −20.8 | 60 | 1150 | ○ | ○ | Δ |
| 51 | 3428 | 6.12 | 3456 | −10.4 | −22.5 | 55 | 1150 | ○ | ○ | Δ |
| 52 | 3133 | 5.88 | 3258 | −10.1 | −21.4 | 55 | 1150 | ○ | ○ | Δ |
| 53 | 2964 | 5.78 | 3125 | −10.5 | −21.9 | 55 | 1150 | Δ | ○ | Δ |
| 54 | 2759 | 5.63 | 2987 | −10.6 | −21.4 | 55 | 1150 | x | ○ | Δ |
| 55 | 2544 | 5.45 | 2789 | −10.2 | −22.0 | 50 | 1150 | x | ○ | Δ |
| 56 | 2239 | 5.53 | 3006 | −9.4 | −22.8 | 50 | 1150 | x | ○ | Δ |

TABLE 10-continued

| | Characteristics of Proto-type Chip | | | | | | | Characteristics Evaluation | | |
|---|---|---|---|---|---|---|---|---|---|---|
| | | | | | High-Temperature | | | | High-Temperature | |
| Experimental Example | Permittivity | DF (%) | RC (ΩF) | TCC (%) (85° C.) | TCC (%) (125° C.) | Withstand Voltage (V/μm) | Sintering Temperature (° C.) | Permittivity | Withstand Voltage | Sintering Property |
| 57 | 2078 | 4.89 | 3125 | −9.3 | −20.7 | 50 | 1150 | x | ○ | Δ |
| 58 | 1944 | 4.77 | 3360 | −9.4 | −21.3 | 45 | 1150 | x | ○ | Δ |
| 59 | 1869 | 4.68 | 3155 | −9.2 | −22.0 | 45 | 1150 | x | ○ | Δ |

○ indicates "good",
Δ indicates "fair", and
x indicates "defective".

Table 9 illustrates compositions in which the content of the second accessory ingredient ($MgCO_3$) is 2.0 moles, based on 100 moles of $BaTiO_3$, and Table 10 illustrates characteristics of the proto-type chips corresponding to these compositions. In Experimental Examples 50 to 59, in Experimental Example 50 in which the Ba/Si ratio, which is the content ratio of the fourth accessory ingredient (Ba) and the sixth accessory ingredient (Si), was 0 in a state in which was implemented. In addition, the high-temperature withstand voltage characteristics were good (60 V/μm or more) in this composition range.

In addition, it may be appreciated that in all of the Experimental Examples of Table 9, since TCC at 85° C. was less than ±15% under the measurement condition in which a high level of AC electric field of AC 0.5 V/μm was applied, the X5R standard was satisfied.

TABLE 11

| | Number of Moles of Respective Additive Based on 100 Moles of Base Material Main Ingredient $BaTiO_3$ | | | | | | | | | | | | |
|---|---|---|---|---|---|---|---|---|---|---|---|---|---|
| | First Accessory Ingredient | | Second Accessory Ingredient | Third Accessory Ingredient | Fourth Accessory Ingredient | Fifth Accessory Ingredient | | Sixth Accessory Ingredient | | Seventh Accessory Ingredient | | | |
| Experimental Example | $MnO_2$ | $V_2O_5$ | $MgCO_3$ | $Y_2O_3$ | $BaCO_3$ | Ca | Zr | $Al_2O_3$ | $SiO_2$ | $Bi_2O_3$ | $Li_2O_3$ | CuO | Ba/Si |
| 60 | 0.200 | 0.100 | 0.00 | 0.30 | 0.50 | 1.00 | 1.00 | 0.20 | 0.60 | 0.00 | 0.00 | 0.00 | 0.83 |
| 61 | 0.200 | 0.100 | 0.00 | 0.30 | 0.75 | 1.00 | 1.00 | 0.20 | 0.60 | 0.00 | 0.00 | 0.00 | 1.25 |
| 62 | 0.200 | 0.100 | 0.00 | 0.30 | 1.00 | 1.00 | 1.00 | 0.20 | 0.60 | 0.00 | 0.00 | 0.00 | 1.67 |
| 63 | 0.200 | 0.100 | 0.00 | 0.30 | 2.00 | 1.00 | 1.00 | 0.20 | 2.40 | 0.00 | 0.00 | 0.00 | 0.83 |
| 64 | 0.200 | 0.100 | 0.00 | 0.30 | 3.00 | 1.00 | 1.00 | 0.20 | 2.40 | 0.00 | 0.00 | 0.00 | 1.25 |
| 65 | 0.200 | 0.100 | 0.00 | 0.30 | 4.00 | 1.00 | 1.00 | 0.20 | 2.40 | 0.00 | 0.00 | 0.00 | 1.67 |

TABLE 12

| | Characteristics of Proto-type Chip | | | | | | | Characteristics Evaluation | | |
|---|---|---|---|---|---|---|---|---|---|---|
| | | | | | High-Temperature | | | | High-Temperature | |
| Experimental Example | Permittivity | DF (%) | RC (ΩF) | TCC (%) (85° C.) | TCC (%) (125° C.) | Withstand Voltage (V/μm) | Sintering Temperature (° C.) | Permittivity | Withstand Voltage | Sintering Property |
| 60 | 3235 | 5.67 | 3325 | −8.4 | −19.4 | 65 | 1150 | ○ | ○ | Δ |
| 61 | 3945 | 6.45 | 3126 | −8.2 | −19.2 | 65 | 1150 | ○ | ○ | Δ |
| 62 | 2245 | 4.89 | 3233 | −8.0 | −18.4 | 65 | 1150 | x | ○ | Δ |
| 63 | 3412 | 5.23 | 3045 | −8.1 | −18.8 | 60 | 1150 | ○ | ○ | Δ |
| 64 | 3951 | 6.62 | 3175 | −8.3 | −19.1 | 60 | 1150 | ○ | ○ | Δ |
| 65 | 2045 | 4.63 | 3222 | −8.2 | −18.7 | 60 | 1150 | x | ○ | Δ |

○ indicates "good",
Δ indicates "fair", and
x indicates "defective".

contents of the remaining ingredients were fixed, maximum permittivity of 3605 was measured, but as the Ba/Si ratio was increased, permittivity tended to be decreased. In the case in which the Ba/Si ratio was 0.96 (Experimental Example 53) or more, permittivity was decreased to 3000 or less. Therefore, in the case in which the content of Mg of the second accessory ingredient was 2.0 moles, based on 100 moles of the base material main ingredient, when the Ba/Si ratio was in a range of 0 to 0.64, a high degree of permittivity Experimental Examples 60 to 62 and 63 to 65 in Table 11 illustrate Experimental Examples in which when the content of the second accessory ingredient ($MgCO_3$) was 0 mole, and the content of the sixth accessory ingredient ($SiO_2$) was 0.6 moles and 2.4 moles, respectively, the Ba/Si ratio was changed, and Table 12 illustrates characteristics of the proto-type chips corresponding to these compositions. Even in the cases in which the content of $SiO_2$ was 0.6 mole and 2.4 moles, when the Ba/Si ratio was 1.25, permittivity was high (3945 and 3951), similarly to the case in which the content of $SiO_2$ was 1.25 moles in Table 1. Therefore, it may be appreciated that maximum permittivity was implemented near a specific Ba/Si ratio (for example, in the case in which the Ba/Si ratio was 1.25 when the second accessory ingredient ($MgCO_3$) was 0), regardless of the content of $SiO_2$. In addition, it may be appreciated that in all of the Experimental Examples of Table 11, since TCC at 85° C. is less than ±15% under the measurement condition in which a high level of AC electric field of AC 0.5 V/μm is applied, X5R standard may be satisfied.

From all the results of Experimental Examples 1 to 65, it may be appreciated that as the content of Mg of the second accessory ingredient is increased from 0 mole to 0.5, 1.0, 1.5, and 2.0 moles, the Ba/Si content ratio at which the relative maximum permittivity may be implemented is decreased from 1.60 to 0.96, 0.64, 0.32, and 0 or so, respectively. The range in which high permittivity is implemented according to the Ba/Si content ratio and the content of Mg is represented by the shaded section of FIG. 1.

TABLE 13

| Experimental Example | First Accessory Ingredient | | Second Accessory Ingredient | Third Accessory Ingredient | Fourth Accessory Ingredient | Fifth Accessory Ingredient | | Sixth Accessory Ingredient | | Seventh Accessory Ingredient | | | |
|---|---|---|---|---|---|---|---|---|---|---|---|---|---|
| | $MnO_2$ | $V_2O_5$ | $MgCO_3$ | $Y_2O_3$ | $BaCO_3$ | Ca | Zr | $Al_2O_3$ | $SiO_2$ | $Bi_2O_3$ | $Li_2O_3$ | CuO | Ba/Si |
| 66 | 0.200 | 0.100 | 0.00 | 0.30 | 1.60 | 1.00 | 1.00 | 0.20 | 1.25 | 0.05 | 0.00 | 0.00 | 1.28 |
| 67 | 0.200 | 0.100 | 0.00 | 0.30 | 1.60 | 1.00 | 1.00 | 0.20 | 1.25 | 0.10 | 0.00 | 0.00 | 1.28 |
| 68 | 0.200 | 0.100 | 0.00 | 0.30 | 1.60 | 1.00 | 1.00 | 0.20 | 1.25 | 0.20 | 0.00 | 0.00 | 1.28 |
| 69 | 0.200 | 0.100 | 0.00 | 0.30 | 1.60 | 1.00 | 1.00 | 0.20 | 1.25 | 0.30 | 0.00 | 0.00 | 1.28 |
| 70 | 0.200 | 0.100 | 0.00 | 0.30 | 1.60 | 1.00 | 1.00 | 0.20 | 1.25 | 0.50 | 0.00 | 0.00 | 1.28 |
| 71 | 0.200 | 0.100 | 0.00 | 0.30 | 1.60 | 1.00 | 1.00 | 0.20 | 1.25 | 0.60 | 0.00 | 0.00 | 1.28 |
| 72 | 0.200 | 0.100 | 0.00 | 0.30 | 1.60 | 1.00 | 1.00 | 0.20 | 1.25 | 0.00 | 0.05 | 0.00 | 1.28 |
| 73 | 0.200 | 0.100 | 0.00 | 0.30 | 1.60 | 1.00 | 1.00 | 0.20 | 1.25 | 0.00 | 0.10 | 0.00 | 1.28 |
| 74 | 0.200 | 0.100 | 0.00 | 0.30 | 1.60 | 1.00 | 1.00 | 0.20 | 1.25 | 0.00 | 0.20 | 0.00 | 1.28 |
| 75 | 0.200 | 0.100 | 0.00 | 0.30 | 1.60 | 1.00 | 1.00 | 0.20 | 1.25 | 0.00 | 0.30 | 0.00 | 1.28 |
| 76 | 0.200 | 0.100 | 0.00 | 0.30 | 1.60 | 1.00 | 1.00 | 0.20 | 1.25 | 0.00 | 0.50 | 0.00 | 1.28 |
| 77 | 0.200 | 0.100 | 0.00 | 0.30 | 1.60 | 1.00 | 1.00 | 0.20 | 1.25 | 0.00 | 0.60 | 0.00 | 1.28 |
| 78 | 0.200 | 0.100 | 0.00 | 0.30 | 1.60 | 1.00 | 1.00 | 0.20 | 1.25 | 0.00 | 0.00 | 0.10 | 1.28 |
| 79 | 0.200 | 0.100 | 0.00 | 0.30 | 1.60 | 1.00 | 1.00 | 0.20 | 1.25 | 0.00 | 0.00 | 0.20 | 1.28 |
| 80 | 0.200 | 0.100 | 0.00 | 0.30 | 1.60 | 1.00 | 1.00 | 0.20 | 1.25 | 0.00 | 0.00 | 0.40 | 1.28 |
| 81 | 0.200 | 0.100 | 0.00 | 0.30 | 1.60 | 1.00 | 1.00 | 0.20 | 1.25 | 0.00 | 0.00 | 0.60 | 1.28 |
| 82 | 0.200 | 0.100 | 0.00 | 0.30 | 1.60 | 1.00 | 1.00 | 0.20 | 1.25 | 0.00 | 0.00 | 1.00 | 1.28 |
| 83 | 0.200 | 0.100 | 0.00 | 0.30 | 1.60 | 1.00 | 1.00 | 0.20 | 1.25 | 0.00 | 0.00 | 1.20 | 1.28 |
| 84 | 0.200 | 0.100 | 0.00 | 0.30 | 1.60 | 1.00 | 1.00 | 0.20 | 1.25 | 0.30 | 0.30 | 0.60 | 1.28 |
| 85 | 0.200 | 0.100 | 0.00 | 0.30 | 1.60 | 1.00 | 1.00 | 0.20 | 1.25 | 0.50 | 0.50 | 1.00 | 1.28 |
| 86 | 0.200 | 0.100 | 0.00 | 0.30 | 1.60 | 1.00 | 1.00 | 0.20 | 1.25 | 0.60 | 0.60 | 1.20 | 1.28 |

TABLE 14

| Experimental Example | Characteristics of Proto-type Chip | | | | | | | Characteristics Evaluation | | |
|---|---|---|---|---|---|---|---|---|---|---|
| | Permittivity | DF (%) | RC (ΩF) | TCC (%) (85° C.) | High-Temperature TCC (%) (125° C.) | Withstand Voltage (V/μm) | Sintering Temperature (° C.) | Permittivity | High-Temperature Withstand Voltage | Sintering Property |
| 66 | 4125 | 6.72 | 3168 | −8.5 | −22.0 | 65 | 1120 | ○ | ○ | ○ |
| 67 | 4206 | 6.85 | 3145 | −8.5 | −22.5 | 65 | 1100 | ○ | ○ | ○ |
| 68 | 4378 | 7.12 | 2846 | −8.4 | −22.6 | 60 | 1090 | ○ | ○ | ○ |
| 69 | 4421 | 7.58 | 2547 | −8.9 | −23.5 | 55 | 1080 | ○ | ○ | ○ |
| 70 | 4689 | 8.03 | 2158 | −9.5 | −24.7 | 50 | 1070 | ○ | ○ | ○ |
| 71 | 5128 | 8.54 | 1045 | −10.5 | −26.8 | 45 | 1060 | ○ | x | ○ |
| 72 | 4226 | 6.67 | 3287 | −8.3 | −21.8 | 65 | 1120 | ○ | ○ | ○ |
| 73 | 4321 | 6.84 | 2985 | −8.5 | −22.5 | 60 | 1100 | ○ | ○ | ○ |
| 74 | 4687 | 6.93 | 2847 | −8.9 | −23.4 | 60 | 1090 | ○ | ○ | ○ |
| 75 | 4772 | 7.25 | 2638 | −9.4 | −24.1 | 55 | 1080 | ○ | ○ | ○ |
| 76 | 5023 | 7.86 | 2004 | −10.4 | −25.8 | 50 | 1070 | ○ | ○ | ○ |
| 77 | 5684 | 8.79 | 1162 | −11.6 | −27.4 | 40 | 1060 | ○ | x | ○ |
| 78 | 4105 | 6.58 | 3125 | −8.8 | −23.4 | 65 | 1130 | ○ | ○ | ○ |
| 79 | 3954 | 6.12 | 3245 | −8.5 | −22.8 | 60 | 1120 | ○ | ○ | ○ |
| 80 | 3845 | 5.89 | 3341 | −8.3 | −21.5 | 55 | 1110 | ○ | ○ | ○ |
| 81 | 3726 | 5.72 | 3268 | −7.8 | −20.5 | 50 | 1100 | ○ | ○ | ○ |
| 82 | 3458 | 5.23 | 3785 | −7.4 | −20.4 | 50 | 1090 | ○ | ○ | ○ |
| 83 | 2984 | 4.85 | 3658 | −7.4 | −20.3 | 40 | 1080 | x | x | ○ |

TABLE 14-continued

| | Characteristics of Proto-type Chip | | | | | | | Characteristics Evaluation | | |
|---|---|---|---|---|---|---|---|---|---|---|
| | | | | | | High-Temperature | | | High-Temperature | |
| Experimental Example | Permittivity | DF (%) | RC (ΩF) | TCC (%) (85° C.) | TCC (%) (125° C.) | Withstand Voltage (V/μm) | Sintering Temperature (° C.) | Permittivity | Withstand Voltage | Sintering Property |
| 84 | 4458 | 6.97 | 3126 | −9.1 | −23.4 | 55 | 1050 | ○ | ○ | ○ |
| 85 | 4684 | 7.12 | 3077 | −9.3 | −23.9 | 55 | 1040 | ○ | ○ | ○ |
| 86 | 4137 | 6.61 | 1684 | −10.6 | −26.8 | 45 | 1030 | ○ | x | ○ |

○ indicates "good",
Δ indicates "fair", and
x indicates "defective".

Table 13 illustrates a change in the content of the seventh accessory ingredient for decreasing a sintering temperature of the composition of Experimental Example 6, and Table 14 illustrates characteristics of proto-type chips corresponding to Experimental Examples of Table 13. Experimental Examples 66 to 71 illustrate Experimental Examples in which a content of Bi was changed, and it may be appreciated that as the content of Bi was increased, the suitable sintering temperature tended to be decreased, permittivity tended to be increased, and high temperature withstand voltage characteristics tended to be deteriorated. In Experimental Example 71 in which the content of Bi was excessively high (0.6 moles) as an element ratio, based on 100 moles of the base material main ingredient, there was a problem in that high temperature withstand voltage characteristics were decreased to be less than 50V/μm.

Experimental Examples 72 to 77 illustrate Experimental Examples in which a content of Li was changed, and it may be appreciated that as the content of Li was increased, the suitable sintering temperature tended to be decreased, permittivity tended to be increased, and high temperature withstand voltage characteristics tended to be deteriorated. In Experimental Example 77 in which the content of Li was excessively high (0.6 moles) as an element ratio, based on 100 moles of the base material main ingredient, there was a problem in that high temperature withstand voltage characteristics were decreased to be less than 50V/μm, similarly to Experimental Example in which Bi was added.

Experimental Examples 78 to 83 illustrate Experimental Examples in which a content of Cu was changed, and it may be appreciated that as the content of Cu was increased, a suitable sintering temperature was decreased, permittivity and high-temperature withstand voltage characteristics were deteriorated. In the case in which the content of Cu was excessively high (1.2 moles) as an element ratio, based on 100 moles of the base material main ingredient as in Experimental Example 83, the suitable sintering temperature was low (1100° C.), but there was a problem in that permittivity was 3000 or less and high-temperature withstand voltage characteristics were decreased to be less than 50 V/μm.

Experimental Examples 84 to 86 illustrate compositions in which all of Bi, Li, and Cu were added and the contents of Bi, Li, and Cu were changed. It may be appreciated that in Experimental Examples 84 and 85 in which a content of Bi was 0.5 mole or less as an element ratio, a content of Li was 0.5 mole or less as an element ratio and a content of Cu was 1.0 mole or less as an element ratio, based on 100 moles of a dielectric base material, a suitable sintering temperature was significantly low (about 1040 to 1050° C.), and characteristics of high-temperature withstand voltage of 50V/μm or more were implemented. Meanwhile, in the case in which the content of each of Bi, Li, and Cu was excessively high as the element ratio, based on 100 moles of the dielectric base material, as in Experimental Example 86, the suitable sintering temperature was significantly low (1030° C.), but there was a problem in that high-temperature withstand voltage characteristics were decreased to be less than 50V/μm.

It may be confirmed from the results of Experimental Examples 66 to 86 that in order to decrease the sintering temperature, the seventh accessory ingredient needs to contain one or more elements among Bi, Li, and Cu, and as a suitable content of the seventh accessory ingredient, the content of a respective element is 0.1 to 1.0 mole as an element ratio, based on 100 moles of the base material main ingredient.

From all the results of Experimental Examples 1 to 65, it may be appreciated that as the content of Mg of the second accessory ingredient was increased from 0 mole to 0.5, 1.0, 1.5, and 2.0 moles, based on 100 moles of the base material main ingredient, the Ba/Si ratio at which the maximum permittivity was implemented was decreased from 1.60 to 0.96, 0.64, 0.32, and 0 or so, respectively. The range in which a high degree of permittivity was implemented according to the Ba/Si content ratio and the content of Mg is represented by the shaded section of FIG. 1.

In addition, from all the results of Experimental Examples 66 to 86, it may be appreciated that in a dielectric ceramic composition for implementing the sintering temperature less than 1130° C. while maintaining a high degree of permittivity, the contents of Ba and Si are within the shaded section of FIG. 1, one or more elements among Bi, Li, and Cu is contained therein as the seventh accessory ingredient, and a content of a respective element of the seventh accessory ingredient is within a range of 0.1 to 1.0 mole as the element ratio, based on 100 moles of the base material main ingredient.

According to embodiments in the present disclosure, the dielectric ceramic composition having a high degree of permittivity, good high-temperature withstand voltage characteristics, and a relatively low sintering temperature, and the multilayer ceramic capacitor including the same may be provided.

While exemplary embodiments have been shown and described above, it will be apparent to those skilled in the art that modifications and variations could be made without departing from the scope of the invention as defined by the appended claims.

What is claimed is:

1. A dielectric ceramic composition comprising a base material main ingredient and an accessory ingredient,
   wherein the accessory ingredient contains one or more selected from a group consisting of oxides and carbonates of one or more elements among Bi and Li, and
   when the accessory ingredient contains Bi, a content of Bi is 0.1 to 0.5 part by mole, based on 100 parts by mole of the base material main ingredient, and
   when the accessory ingredient contains Li, a content of Li is 0.1 to 0.5 part by mole, based on 100 parts by mole of the base material main ingredient,
   wherein the accessory ingredient further comprises a first accessory ingredient containing one or more selected from a group consisting of oxides and carbonates of one or more variable-valence acceptor elements among Mn, V, Cr, Fe, Ni, Co, Cu, and Zn,
   a sum of contents of one or more variable-valence acceptor elements among Mn, V, Cr, Fe, Ni, Co, Cu, and Zn contained in the first accessory ingredient being 0.1 to 2.0 parts by mole, based on 100 parts by mole of the base material main ingredient.

2. The dielectric ceramic composition of claim 1, wherein the base material main ingredient comprises one or more selected from a group consisting of $BaTiO_3$, $(Ba_{1-x}Ca_x)(Ti_{1-y}Ca_y)O_3$ ($0\leq x\leq 0.3$ and $0\leq y\leq 0.1$), $(Ba_{1-x}Ca_x)(Ti_{1-y}Zr_y)O_3$ ($0\leq x\leq 0.3$ and $0\leq y\leq 0.5$), and $Ba(Ti_{1-y}Zr_y)O_3$ ($0\leq y\leq 0.5$).

3. The dielectric ceramic composition of claim 1, wherein the accessory ingredient further comprises a second accessory ingredient containing one or more of oxides and carbonates of fixed-valence acceptor elements,
   a content of the fixed-valence acceptor elements contained in the second accessory ingredient being 2.0 parts by mole or less, based on 100 parts by mole of the base material main ingredient.

4. The dielectric ceramic composition of claim 1, wherein the accessory ingredient further comprises a third accessory ingredient containing one or more selected from a group consisting of oxides and carbonates of one or more elements among Y, Dy, Ho, Er, Gd, Ce, Nd, Pm, Eu, Tb, Tm, Yb, Lu, and Sm,
   a sum of contents of one or more elements among Y, Dy, Ho, Er, Gd, Ce, Nd, Pm, Eu, Tb, Tm, Yb, Lu, and Sm contained in the third accessory ingredient being 4.0 parts by mole or less, based on 100 parts by mole of the base material main ingredient.

5. The dielectric ceramic composition of claim 1, wherein the accessory ingredient further comprises a fourth accessory ingredient containing one or more of oxides and carbonates of Ba,
   a content of Ba contained in the fourth accessory ingredient being 4.0 parts by mole or less, based on 100 parts by mole of the base material main ingredient.

6. The dielectric ceramic composition of claim 1, wherein the accessory ingredient further comprises a fifth accessory ingredient containing one or more selected from a group consisting of oxides and carbonates of either of or both of Ca and Zr,
   a sum of contents of either of or both of Ca and Zr contained in the fifth accessory ingredient being 20 parts by mole or less, based on 100 parts by mole of the base material main ingredient.

7. The dielectric ceramic composition of claim 1, wherein the accessory ingredient further comprises a sixth accessory ingredient containing one or more selected from a group consisting of glass containing Si and oxides and carbonates of either of or both of Si and Al,
   a sum of contents of either of or both of Si and Al contained in the sixth accessory ingredient being 3.0 parts by mole or less, based on 100 parts by mole of the base material main ingredient.

8. The dielectric ceramic composition of claim 1, wherein the accessory ingredient comprises:
   one or more selected from a group consisting of a second accessory ingredient containing one or more of the oxides and carbonates of fixed-valence acceptor elements and a fourth accessory ingredient containing one or more of the oxides and carbonates of Ba; and
   a sixth accessory ingredient containing one or more selected from a group consisting of glass containing Si and oxides and carbonates of Si, and
   when a content of Mg based on 100 parts by mole of the base material main ingredient is defined as x, and a content ratio (Ba/Si) of Ba and Si is defined as y, Mg, Ba, and Si are contained within a content range represented as straight lines connecting points to one another at which (x, y) is represented as A(0, 1.6), B(0.5, 1.28), C(1.0, 1.28), D(2.0, 0.64), E(2.0, 0), F(1.0, 0), G(0.5, 0.32), and H(0, 0.96), respectively, and contained to be within a region enclosed by the straight lines.

9. A multilayer ceramic capacitor comprising:
   a ceramic body in which dielectric layers and first and second internal electrodes are alternately stacked; and
   first and second external electrodes formed on outer surfaces of the ceramic body and electrically connected to the first and second internal electrodes,
   wherein the dielectric layer contains a base material main ingredient and an accessory ingredient,
   the accessory ingredient containing one or more selected from a group consisting of oxides and carbonates of one or more elements among Bi and Li, and
   when the accessory ingredient contains Bi, a content of Bi being 0.1 to 0.5 part by mole, based on 100 parts by mole of the base material main ingredient, and
   when the accessory ingredient contains Li, a content of Li being 0.1 to 0.5 part by mole, based on 100 parts by mole of the base material main ingredient,
   wherein the accessory ingredient further comprises a first accessory ingredient containing one or more of one or more variable-valence acceptor elements selected from a group consisting of Mn, V, Cr, Fe, Ni, Co, Cu, and Zn, oxides of the variable-valence acceptor elements, and carbonates of the variable-valence acceptor elements,
   a sum of contents of one or more variable-valence acceptor elements among Mn, V, Cr, Fe, Ni, Co, Cu, and Zn contained in the first accessory ingredient being 0.1 to 2.0 parts by mole, based on 100 parts by mole of the base material main ingredient.

10. The multilayer ceramic capacitor of claim 9, wherein the base material main ingredient comprises one or more selected from a group consisting of $BaTiO_3$, $(Ba_{1-x}Ca_x)(Ti_{1-y}Ca_y)O_3$ ($0\leq x\leq 0.3$ an $0\leq y\leq 0.1$), $(Ba_{1-x}Ca_x)(Ti_{1-y}Zr_y)O_3$ ($0\leq x\leq 0.3$ and $0\leq y\leq 0.5$), and $Ba(Ti_{1-y}Zr_y)O_3$ ($0<y\leq 0.5$).

11. The multilayer ceramic capacitor of claim 9, wherein the accessory ingredient further comprises a second accessory ingredient containing one or more of fixed-valence acceptor elements, oxides of the fixed-valence acceptor elements, and carbonates of the fixed-valence acceptor elements,
   a content of the fixed-valence acceptor elements contained in the second accessory ingredient being 2.0 parts by mole or less, based on 100 parts by mole of the base material main ingredient.

12. The multilayer ceramic capacitor of claim 9, wherein the accessory ingredient further comprises a third accessory ingredient containing one or more of one or more elements selected from a group consisting of Y, Dy, Ho, Er, Gd, Ce, Nd, Pm, Eu, Tb, Tm, Yb, Lu, and Sm, oxides of the selected one or more elements selected from the group, and carbonates of the selected one or more elements selected from the group,
    a sum of contents of one or more elements among Y, Dy, Ho, Er, Gd, Ce, Nd, Pm, Eu, Tb, Tm, Yb, Lu, and Sm contained in the third accessory ingredient being 4.0 parts by mole or less, based on 100 parts by mole of the base material main ingredient.

13. The multilayer ceramic capacitor of claim 9, wherein the accessory ingredient further comprises a fourth accessory ingredient containing one or more of Ba, oxides of Ba, and carbonates of Ba,
    a content of Ba contained in the fourth accessory ingredient being 4.0 parts by mole or less, based on 100 parts by mole of the base material main ingredient.

14. The multilayer ceramic capacitor of claim 9, wherein the accessory ingredient further comprises a fifth accessory ingredient containing one or more of one or more elements selected from a group consisting of Ca and Zr, oxides of the one or more elements selected from the group consisting of Ca and Zr, and carbonates of the one or more elements selected from the group consisting of Ca and Zr,
    a sum of contents of either of or both of Ca and Zr contained in the fifth accessory ingredient being 20 parts by mole or less, based on 100 parts by mole of the base material main ingredient.

15. The multilayer ceramic capacitor of claim 9, wherein the accessory ingredient further comprises a sixth accessory ingredient containing one or more of one or more element selected from a group consisting of Si and Al, oxides of the one or more element selected from the group consisting of Si and Al, carbonates of the one or more element selected from the group consisting of Si and Al, and glass containing Si,
    a sum of contents of either of or both of Si and Al contained in the sixth accessory ingredient being 3.0 parts by mole or less, based on 100 parts by mole of the base material main ingredient.

16. The multilayer ceramic capacitor of claim 9, wherein the accessory ingredient comprises:
    one or more selected from a group consisting of a second accessory ingredient containing one or more of fixed-valence acceptor elements, oxides of the fixed-valence acceptor elements, and carbonates of the fixed-valence acceptor elements, and a fourth accessory ingredient containing one or more of Ba, oxides of Ba, and carbonates of Ba; and
    a sixth accessory ingredient containing one or more of Si, oxides of Si, carbonates of Si, and glass containing Si, and
    when a content of Mg based on 100 parts by mole of the base material main ingredient is defined as x, and a content ratio (Ba/Si) of Ba and Si is defined as y, Mg, Ba, and Si are contained within a content range represented as straight lines connecting points to one another at which (x, y) is represented as A(0, 1.6), B(0.5, 1.28), C(1.0, 1.28), D(2.0, 0.64), E(2.0, 0), F(1.0, 0), G(0.5, 0.32), and H(0, 0.96), respectively, and contained to be within a region enclosed by the straight lines.

17. The dielectric ceramic composition of claim 3, wherein the fixed-valence acceptor element is Mg.

18. The dielectric ceramic composition of claim 8, wherein the fixed-valence acceptor element is Mg.

19. The multilayer ceramic capacitor of claim 11, wherein the fixed-valence acceptor element is Mg.

20. The multilayer ceramic capacitor of claim 16, wherein the fixed-valence acceptor element is Mg.

21. A dielectric ceramic composition comprising a base material main ingredient and an accessory ingredient,
    wherein the accessory ingredient includes oxides and carbonates of Bi, Li, and Cu,
    wherein a content of Bi is 0.1 to 0.5 part by mole, based on 100 parts by mole of the base material main ingredient,
    wherein a content of Li is 0.1 to 0.5 part by mole, based on 100 parts by mole of the base material main ingredient, and
    wherein a content of Cu is 0.1 to 1.0 part by mole, based on 100 parts by mole of the base material main ingredient.

22. A multilayer ceramic capacitor comprising:
    a ceramic body in which dielectric layers and first and second internal electrodes are alternately stacked; and
    first and second external electrodes formed on outer surfaces of the ceramic body and electrically connected to the first and second internal electrodes,
    wherein the dielectric layer contains a base material main ingredient and an accessory ingredient,
    wherein the accessory ingredient includes oxides and carbonates of Bi, Li, and Cu,
    wherein a content of Bi is 0.1 to 0.5 part by mole, based on 100 parts by mole of the base material main ingredient,
    wherein a content of Li is 0.1 to 0.5 part by mole, based on 100 parts by mole of the base material main ingredient, and
    wherein a content of Cu is 0.1 to 1.0 part by mole, based on 100 parts by mole of the base material main ingredient.

* * * * *